United States Patent
Komaki

(10) Patent No.: US 7,836,157 B2
(45) Date of Patent: Nov. 16, 2010

(54) FILE SHARING SYSTEM AND FILE SHARING SYSTEM SETTING METHOD

(75) Inventor: Toshio Komaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 331 days.

(21) Appl. No.: 12/071,898

(22) Filed: Feb. 27, 2008

(65) Prior Publication Data

US 2009/0164608 A1 Jun. 25, 2009

(30) Foreign Application Priority Data

Dec. 25, 2007 (JP) ............................. 2007-332410

(51) Int. Cl.
*G06F 15/177* (2006.01)
*G06F 15/173* (2006.01)

(52) U.S. Cl. .................. 709/220; 709/223; 709/226

(58) Field of Classification Search ................. 709/220, 709/221, 223, 226
See application file for complete search history.

(56) References Cited

U.S. PATENT DOCUMENTS

| | | | |
|---|---|---|---|
| 6,606,690 B2 * | 8/2003 | Padovano | 711/148 |
| 6,950,914 B2 * | 9/2005 | Iwami et al. | 711/154 |
| 7,058,545 B2 * | 6/2006 | Chang et al. | 702/186 |
| 7,249,347 B2 * | 7/2007 | Chang et al. | 717/113 |
| 7,290,167 B2 * | 10/2007 | Fujibayashi | 714/6 |
| 7,349,961 B2 * | 3/2008 | Yamamoto | 709/224 |
| 7,353,434 B2 * | 4/2008 | Fujimoto | 714/54 |
| 7,437,676 B1 * | 10/2008 | Magdum et al. | 715/738 |
| 7,457,925 B2 * | 11/2008 | Fujino | 711/154 |
| 7,506,040 B1 * | 3/2009 | Rabe et al. | 709/223 |
| 2001/0054093 A1 | 12/2001 | Iwatani | |
| 2005/0229030 A1 | 10/2005 | Nagashima et al. | |

FOREIGN PATENT DOCUMENTS

| | | |
|---|---|---|
| JP | 2002-63063 | 6/2001 |
| JP | 2005-250927 | 3/2004 |

* cited by examiner

*Primary Examiner*—Hussein A Elchanti
(74) *Attorney, Agent, or Firm*—Volpe and Koenig, P.C.

(57) ABSTRACT

The file sharing system of the present invention can collectively carry out the settings for a primary NAS and a secondary NAS by sending a plurality of pieces of configuration information to the respective NAS from a setting device. The configuration information setting device sends NAS configuration information, disk configuration information, snapshot configuration information, and remote copy configuration information to the primary NAS and the secondary NAS in a prescribed order. The respective NAS determine whether or not the respective configuration information received from the configuration information setting device can be realized, and when the determination is that this configuration information is realizable, respectively set the configuration information in their own devices.

4 Claims, 22 Drawing Sheets

FIG. 8

T11 — PRIMARY NAS UNIQUE INFORMATION

| | | | | |
|---|---|---|---|---|
| C111 | DEVICE NAME | | | STORAGE A |
| C112 | SERIAL NUMBER | | | 75000018 |
| C113 | NODE NAME | | | CTL A1<br>CTL A2 |
| C114 | CLUSTER NAME | | | CLUSTER A |
| C115<br>PORT IP ADDRESS | C1151 | CTL A1 | PORT 1 | 192.168.0.16 |
| | | | PORT 2 | 192.168.0.17 |
| | | | PORT 3 | 192.168.0.18 |
| | | | PORT 4 | 192.168.0.19 |
| | C1152 | CTL A2 | PORT 1 | 192.168.0.20 |
| | | | PORT 2 | 192.168.0.21 |
| | | | PORT 3 | 192.168.0.22 |
| | | | PORT 4 | 192.168.0.23 |

T12 — SECONDARY NAS UNIQUE INFORMATION

| | | | | |
|---|---|---|---|---|
| C121 | DEVICE NAME | | | STORAGE B |
| C122 | SERIAL NUMBER | | | 75000077 |
| C123 | NODE NAME | | | CTL B1<br>CTL B2 |
| C124 | CLUSTER NAME | | | CLUSTER B |
| C125<br>PORT IP ADDRESS | C1251 | CTL B1 | PORT 1 | 192.168.0.31 |
| | | | PORT 2 | 192.168.0.32 |
| | | | PORT 3 | 192.168.0.33 |
| | | | PORT 4 | 192.168.0.34 |
| | C1252 | CTL B2 | PORT 1 | 192.168.0.35 |
| | | | PORT 2 | 192.168.0.36 |
| | | | PORT 3 | 192.168.0.37 |
| | | | PORT 4 | 192.168.0.38 |

FIG. 9

| T13 | | | | |
|---|---|---|---|---|
| C131<br>COMMON<br>INFORMATION | MANAGEMENT<br>SERVER<br>IP ADDRESS | C1311 | NTP SERVER | 192.168.0.50 |
| | | C1312 | DNS SERVER | 192.168.0.60 |
| | | C1313 | SNMP SERVER | 192.168.0.70 |
| | | | ... | ... |
| C132 | USER<br>INFORMATION | C1321 | GROUP NAME | ADMINISTRATOR |
| | | C1322 | USER NAME | user1 |
| C133 | FILE SYSTEM<br>INFORMATION | C1331 | FS NAME | FS001 |
| | | C1332 | LUN | LUN2, LUN3 |
| | | C1333 | FS NAME | FS002 |
| | | C1334 | LUN | LUN6, LUN7 |

FIG. 10

DISK CONFIGURATION INFORMATION TABLE T20

| C21 | C22 | C23 RAID CONFIGURATION INFORMATION | | | | | | | C24 LU CONFIGURATION INFORMATION | | | |
|---|---|---|---|---|---|---|---|---|---|---|---|---|
| | | C231 | C232 | C233 | C234 | C235 | C236 | C237 | C241 | C242 | C243 | C244 |
| DEVICE NAME | SERIAL NUMBER | RAID GROUP NO. | RAID LEVEL | DRIVE TYPE | DRIVE SIZE | CONFIGURATION | DISK START LOCATION | TOTAL SIZE | LUN | CTL | LU SIZE | STATUS |
| STORAGE A | 75000018 | 0 | 5 | FC | 288G | 4D+1P | 00 00 | 1152GB | 0 | 0 | 1152GB | NORMAL |
| | | 1 | 6 | FC | 288G | 4D+4P | 00 05 | 1152GB | 1 | 1 | 1152GB | NORMAL |
| | | 2 | 5 | FC | 288G | 4D+1P | 01 00 | 1152GB | 2 | 0 | 10G | NORMAL |
| | | | | | | | | | 3 | 0 | 10G | NORMAL |
| | | | | | | | | | 4 | 0 | 10G | NORMAL |
| | | | | | | | | | 5 | 0 | 10G | NORMAL |
| | | ⋮ | ⋮ | ⋮ | ⋮ | ⋮ | ⋮ | ⋮ | ⋮ | ⋮ | ⋮ | ⋮ |

FIG. 11

T30 SNAPSHOT CONFIGURATION INFORMATION TABLE

| FS NAME (C31) | NUMBER OF GENERATIONS (C32) | DIFFERENCE STORAGE DESTINATION DEVICE (C33) | MAXIMUM NUMBER OF AUTOMATIC CREATIONS (C34) | AUTOMATIC MOUNT IDENTIFIER (C35) | MAXIMUM NUMBER OF MOUNTS (C36) | ACQUISITION SCHEDULE (C37) | OTHER (C38) |
|---|---|---|---|---|---|---|---|
| FS001 | 50 | LUN0 | 50 | snaps001 | 35 | DAILY 00:00 | ... |
| FS002 | 50 | LUN1 | 50 | snaps002 | 35 | DAILY 02:00 | ... |
| ... | ... | ... | ... | ... | ... | ... | ... |

FIG. 12

REMOTE COPY CONFIGURATION INFORMATION TABLE T40

| REMOTE COPY PAIR NAME C41 | | PRIMARY NAS SETTING C42 | | | SECONDARY NAS SETTING C43 | |
|---|---|---|---|---|---|---|
| REMOTE COPY TARGET TYPE C411 | TARGET AREA C412 | DEVICE NAME C421 | LUN C422 | | DEVICE NAME C431 | LUN C432 |
| FS | FS001 | STORAGE A | LUN2 | | STORAGE B | LUN2 |
|   |   |   | LUN3 | | | LUN3 |
| FS | FS002 | STORAGE A | LUN6 | | STORAGE B | LUN6 |
|   |   |   | LUN7 | | | LUN7 |
| SNAPSHOT | snaps001 | STORAGE A | LUN0 | | STORAGE B | LUN0 |
|   |   |   | LUN2 | | | LUN2 |
|   |   |   | LUN3 | | | LUN3 |
| SNAPSHOT | snaps002 | STORAGE A | LUN1 | | STORAGE B | LUN1 |
|   |   |   | LUN6 | | | LUN6 |
|   |   |   | LUN7 | | | LUN7 |

FILE SHARING SYSTEM AND FILE SHARING SYSTEM SETTING METHOD

CROSS-REFERENCE TO PRIOR APPLICATION

This application relates to and claims the benefit of priority from Japanese Patent Application No. 2007-332410, filed on Dec. 25, 2007, the entire disclosure of which is incorporated herein by reference.

BACKGROUND OF THE INVENTION

1. Field of the Invention

The present invention relates to a file sharing system and a setting method for a file sharing system.

2. Description of the Related Art

For example, a file sharing device known as NAS (Network Attached Storage) is used to manage file data in data management systems that handle large volumes of data, such as those installed at companies and municipalities. A plurality of host computers (hereinafter, the host) can share files via the file sharing device.

A redundant logical storage area can be achieved by virtualizing, on the basis of RAID (Redundant Array of Independent Disks), storage areas that each has a plurality of disk drives. The file sharing device can store file data in the redundant storage areas. Therefore, even if a failure should occur in a portion of the disk drives, the other normal disk drives can be used to restore the data inside the failed disk drive.

Furthermore, a file sharing system can be constructed from a plurality of file sharing devices in preparation for a situation in which the functions of an entire file sharing device are suspended due to an earthquake, fire or other such disaster. Making the storage content of the one file sharing device coincide with the storage content of the other file sharing device makes it possible to use the other file sharing device to provide file sharing services to the host if the one file sharing device shuts down.

In the case of a system, which operates a plurality of file sharing devices together, the user must manually set each file sharing device individually. Therefore, usability is poor due to the burden placed on the user by the increased number of setting processes, and the increased likelihood of human error this entails.

Although it is not file sharing system-related technology, for example, a technology for providing a management server in a SAN (Storage Area Network), connecting the management server to respective host computers and storage devices via a LAN (Local Area Network), and carrying out comprehensive control is known (Japanese Patent Laid-open No. 2002-63063).

Furthermore, technology for automatically setting a storage system copy configuration by issuing an indication from the management server to the respective host computers is also known (Japanese Patent Laid-open No. 2005-250927).

In the prior art, the configuration of a storage device can be set via an indication from the management server. However, since the prior art is not related to a file sharing system, these technologies cannot be used as-is in a file sharing system. This is because the network settings, device settings, and application settings of the respective file sharing devices must be carried out in a prescribed order in a file sharing system. Furthermore, the prior art does not provide disclosures about omitting useless indications, and determining whether or not the contents of an indication can be set for a setting-targeted file sharing device.

SUMMARY OF THE INVENTION

With the foregoing in view, an object of the present invention is to provide a file sharing system and file sharing system setting method, which enable a setting operation to be carried out efficiently by causing a plurality of pieces of configuration information for setting a file sharing device to be set in a prescribed order. Another object of the present invention is to provide a file sharing system and a file sharing system setting method, which enable setting operation efficiency to be further improved by managing the history of the respective configuration information so as to send to the file sharing devices only the scope of respective configuration information required to make new settings. Yet other objects of the present invention should become clear from the descriptions of the aspects of the embodiment provided hereinbelow.

A file sharing system according to a first aspect of the present invention for solving the problems is a file sharing system, which comprises a first file sharing device having a first storage device, a second file sharing device having a second storage device, and a setting device connected to the file sharing devices, the setting device comprising a configuration information storage unit for respectively storing first configuration information required for providing the file sharing devices to the host computer via a communication network, second configuration information for respectively setting the configurations of the storage devices, and third configuration information required for executing a prescribed process carried out between the first storage device and the second storage device; a configuration information manager for respectively managing the respective configuration information stored in the configuration information storage unit; and a configuration information setting unit for respectively setting the respective configuration information in the file sharing devices by respectively sending the respective configuration information to any one or both of the file sharing devices in the prescribed order of the first configuration information, the second configuration information, and the third configuration information.

In a second aspect according to the first aspect, the configuration information setting unit is for setting the configuration of the second file sharing device on the basis of the first file sharing device, and sends the first configuration information, the second configuration information, and the third configuration information to the second file sharing device in the prescribed order.

In a third aspect according to the second aspect, the second file sharing device determines whether or not the configuration of the first storage device can be set in accordance with the second configuration information, and when the determination is that this setting is not possible, notifies the setting device of an error.

In a fourth aspect according to any of the first through the third aspects, the configuration information manager respectively manages at least the histories of the respective configuration information, and based on the histories of the respective configuration information, the configuration information setting unit respectively sends to either one or both of the file sharing devices the differences between the contents of the respective configuration information to be set and the histories of the respective configuration information.

In a fifth aspect according to any of the first through the third aspects, the configuration information manager respectively manages the history of prescribed one or a plurality of pieces of configuration information of respective configuration information, and comprises a configuration information creation unit for creating anew the prescribed configuration information to be set by using the history of the respective prescribed configuration information, and the configuration information setting unit respectively sends to either one or both of the file sharing devices the difference between the contents of the new prescribed configuration information created by the configuration information creation unit, and the histories.

In a sixth aspect according to any of the first through the fifth aspects, the first configuration information comprises unique information peculiar to each of the file sharing devices, and common information, which is common to the file sharing devices, and the configuration information setting unit (1) determines whether or not the common information set in the first file sharing device coincides with the common information set in the second file sharing device by respectively accessing the file sharing devices, and (2) when the two pieces of common information do not coincide, makes the common information of the first file sharing device coincide with the common information of the second file sharing device by sending the common information set in the first file sharing device to the second file sharing device, and setting this common information in the second file sharing device.

In a seventh aspect, the first file sharing device determines whether or not the configuration of the first storage device can be set in accordance with the second configuration information, and when the determination is that this setting is not possible, notifies the setting device of an error, and, in addition, the second file sharing device also determines whether or not the configuration of the second storage device can be set in accordance with the second configuration information, and when the determination is that this setting is not possible, notifies the setting device of an error.

In an eighth aspect according to the first aspect, the first file sharing device determines whether or not the setting related to the prescribed process is possible in accordance with the third configuration information, and when the determination is that this setting is not possible, notifies the setting device of an error, and, in addition, the second file sharing device also determines whether or not the setting related to the prescribed process is possible in accordance with the third configuration information, and when the determination is that this setting is not possible, notifies the setting device of an error.

In a ninth aspect according to any of the first through the eighth aspects, the prescribed process is either one or both of a snapshot process or a remote copy process.

In a tenth aspect according to any of the first through the ninth aspects, when the second file sharing device is already used by a different host computer, the respective configuration information is respectively set in either one or both of the file sharing devices by making use of the unused portions of the second file sharing device, which is not used by the different host computer.

In an eleventh aspect according to the fifth aspect, when the second file sharing device is already used by a different host computer, the configuration information creation unit uses the unused portions of the second file sharing device, which is not used by the different host computer, to create the prescribed new respective configuration information.

In a twelfth aspect according to either the fifth or the eleventh aspect, the prescribed configuration information is the second configuration information and the third configuration information.

In a thirteenth aspect according to any of the first through the twelfth aspects, the setting device is disposed in either one of the file sharing devices.

A file sharing system setting method according to a fourteenth aspect is a method for carrying out the settings of a file sharing system, which comprises a first file sharing device having a first storage device, a second file sharing device having a second storage device, and a setting device connected to the file sharing devices, and executes a first step for respectively setting first configuration information in the file sharing devices by respectively sending from the setting device to the file sharing devices the first configuration information, which is required for providing the file sharing devices to a host computer by way of a communication network; a second step for respectively setting second configuration information in the file sharing devices by respectively sending from the setting device to the file sharing devices the second configuration information for respectively setting the configurations of the storage devices; and a third step for respectively setting third configuration information in the file sharing devices by respectively sending from the setting device to the file sharing devices the third configuration information, which is required for executing a prescribed process carried out between the first storage device and the second storage device.

In a fifteenth aspect according to the fourteenth aspect, the first configuration information comprises unique information peculiar to each of the file sharing devices, and common information, which is common to the respective file sharing devices, and the first step (1) determines whether or not the common information set in the first file sharing device coincides with the common information set in the second file sharing device by respectively accessing the file sharing devices, and (2) when the two pieces of common information do not coincide, sets the common information set in the first file sharing device in the second file sharing device by sending the common information set in the first file sharing device to the second file sharing device from the setting device.

A computer program according to a sixteenth aspect is a program for causing a computer to function as a setting device for respectively setting a first file sharing device having a first storage device and a second file sharing device having a second storage device, and respectively executes a first step for respectively setting first configuration information in the file sharing devices by respectively sending to the file sharing devices the first configuration information, which is required for providing the file sharing devices to a host computer by way of a communication network; a second step for respectively setting second configuration information in the file sharing devices by respectively sending to the file sharing devices the second configuration information for respectively setting the configurations of the storage devices; and a third step for respectively setting third configuration information in the file sharing devices by respectively sending to the file sharing devices the third configuration information, which is required for executing a prescribed process carried out between the first storage device and the second storage device.

BRIEF DESCRIPTION OF THE DRAWINGS

FIG. 8 is a schematic diagram showing information unique to each NAS;

FIG. 9 is a schematic diagram showing information common to the respective NAS;

FIG. 10 is a schematic diagram showing a disk configuration information table;

FIG. 11 is a schematic diagram showing a snapshot configuration information table;

FIG. 12 is a schematic diagram showing a remote copy configuration information table;

DESCRIPTION OF THE SPECIFIC EMBODIMENT

Figure 1:
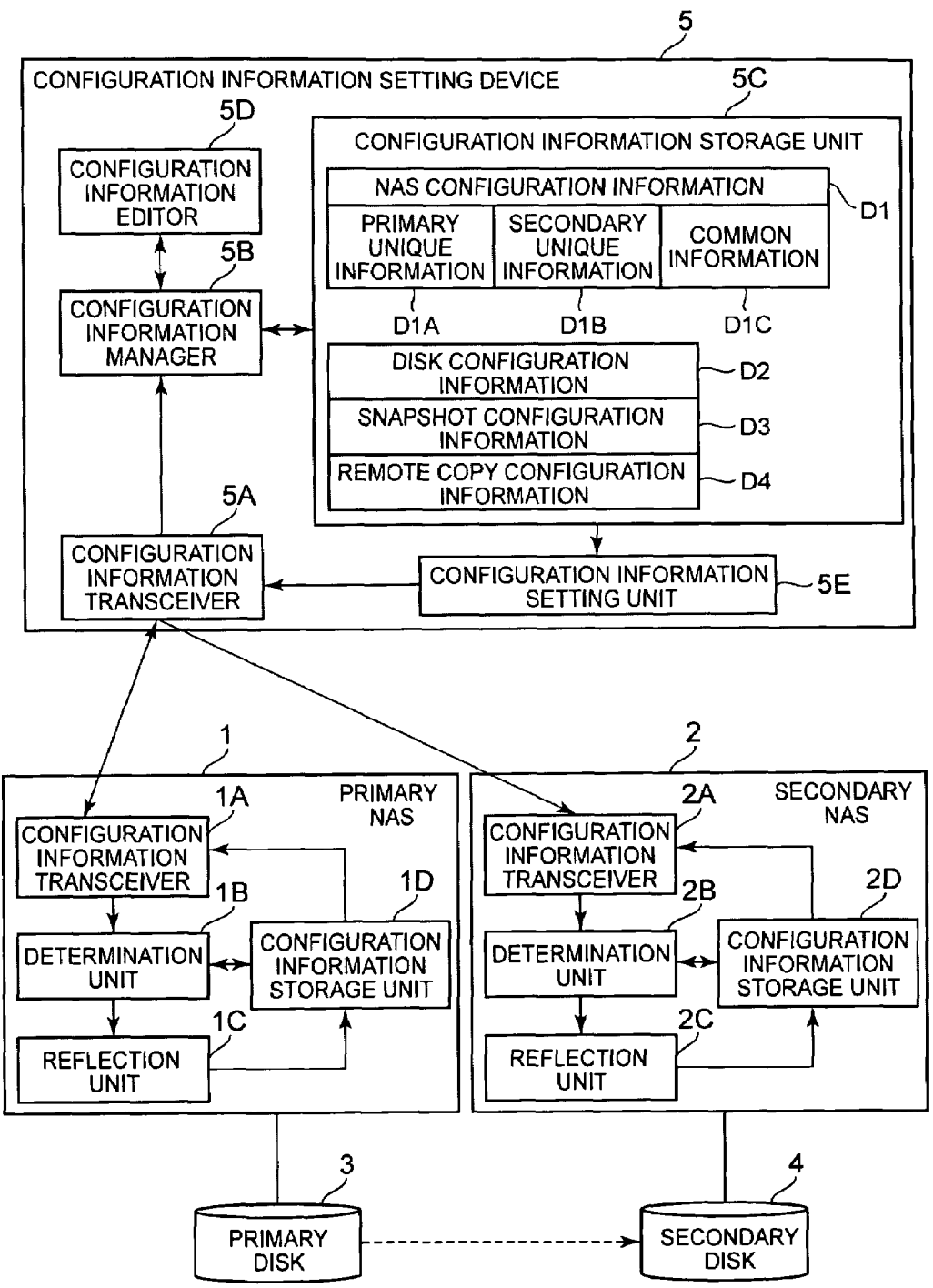
FIG. 1 is a schematic diagram showing an overview of the embodiment of the present invention.

The embodiment of the present invention will be explained below on the basis of the accompanying figures. FIG. 1 is a schematic diagram showing this embodiment in its entirety. FIG. 1 shows an overview of the present invention to the extent necessary to understand and implement the present invention, but the scope of the present invention is not limited to configuration shown in FIG. 1. Furthermore, the details of this embodiment will be made clear in the aspects explained hereinbelow.

A file sharing system comprises a plurality of NAS 1, 2; and a configuration information setting device 5 for setting configurations in the respective NAS 1, 2. A primary NAS 1 corresponds to the first file sharing device, a secondary NAS 2 corresponds to the second file sharing device, a primary disk 3 corresponds to the first storage device, a secondary disk 4 corresponds to the second storage device, and a configuration information setting device 5 corresponds to the setting device. Hereinafter, configuration information setting device may be abbreviated as setting device.

The detailed configurations of the respective NAS 1, 2 will be made clear by the aspects explained hereinbelow. The primary NAS 1, for example, comprises a configuration information transceiver 1A; determination unit 1B; reflection unit 1C; and a configuration information storage unit 1D. Similarly, the secondary NAS 2, for example, comprises a configuration information transceiver 2A; determination unit 2B; reflection unit 2C; and a configuration information storage unit 2D.

The function of the configuration information transceivers 1A, 2A is to carry out the sending and receiving of the respective configuration information with the setting device 5. The setting device 5 can acquire either all or part of set configuration information from the respective NAS 1, 2 by way of the configuration information transceivers 1A, 2A. Furthermore, the setting device 5 can respectively deliver new respective configuration information to the NAS 1, 2 by way of the configuration information transceivers 1A, 2A.

The function of the determination units 1B, 2B is to respectively determine whether or not new respective configuration information received from the setting device 5 is capable of being set. For example, the determination units 1B, 2B can respectively determine whether or not it is possible to create a logical volume having the size and RAID configuration indicated from the setting device 5; whether or not it is possible to construct the snapshot configuration indicated from the setting device 5; and whether or not it is possible to construct the remote copy configuration indicated from the setting device 5.

In this embodiment, a situation in which the configuration of the secondary NAS 2 is set on the basis of the primary NAS 1 will be explained. Therefore, as a rule, the configuration can be such that only the secondary NAS 2 comprises the determination unit 2B. However, there are situations in which the secondary NAS 2 is already used by a different host computer. In this case, it is necessary to utilize the unused portions of the respective types of resources, such as disk drives, communication ports and so forth comprising the secondary NAS 2 to make the primary NAS 1 and secondary NAS 2 correspondent. Thus, there may also be situation in which it is necessary to change the configuration of the primary NAS 1 in order to make use of the unused portions of the secondary NAS 2. Therefore, as shown in FIG. 1, the configuration can be such that the primary NAS 1 also comprises a determination unit 1B.

The function of the reflection units 1C, 2C is to respectively set and realize in the NAS 1, 2 the configuration information inputted from the setting device 5. For example, when the setting device 5 indicates the settings for the network addresses related to the respective management servers, the reflection units 1C, 2C respectively set the indicated network addresses of the servers. Further, for example, when the setting device 5 indicates the construction of a logical volume of a prescribed size, the reflection units 1C, 2C create the indicated prescribed-size logical volume. Furthermore, for example, when the setting device 5 indicates a setting for a snapshot configuration or a remote copy configuration, the reflection units 1C, 2C create the indicated snapshot configuration or remote copy configuration.

The same as described for the determination unit, when constructing a file sharing system having a primary NAS 1 as the main file sharing device, and a secondary NAS 2 as the auxiliary file sharing device, the reflection unit operates mainly inside the secondary NAS 2. However, when the secondary NAS 2 is used by a different host computer, it is necessary to revise the primary NAS 1 setting.

The function of the configuration information storage units 1D, 2D is to store the respective configuration information received from the setting device 5. The configuration information storage units 1D, 2D store the respective configuration information used currently.

The primary NAS 1 comprises a primary disk 3, and the secondary NAS 2 comprises a secondary disk 4. The disks 3, 4 shown in FIG. 1 are both logical storage devices.

The respective NAS 1, 2 can comprise the disks 3, 4 inside the enclosures thereof. Or, as in the aspects explained hereinbelow, the NAS and disk device can be configured as separate devices, and communicatively connected.

As will be explained below, the primary disk 3 and secondary disk 4 create a remote copy pair. A remote copy is a process for transferring and storing data stored in the primary disk 3 to the secondary disk 4 inside a separate device. In this embodiment, the remote copy target includes a file system and a snapshot configuration. A snapshot is a process that makes it possible to manage a storage image of a logical volume at a certain point in time for a plurality of generations.

The configuration of the setting device 5 will be explained. The setting device 5 can be configured as a separate computer device from the NAS 1, 2, or, for example, can be configured so as to be disposed inside the primary NAS 1.

The setting device 5, for example, comprises a configuration information transceiver 5A; configuration information manager 5B; configuration information storage unit 5C; configuration information editor 5D; and configuration information setting unit 5E.

The functions of the configuration information transceiver 5A are to send configuration information to the NAS 1, 2, and to acquire configuration information from the NAS 1, 2.

The function of the configuration information manager 5B is to manage the respective configuration information. The configuration information manager 5B not only manages the most recent respective configuration information, but also manages the histories thereof. The function of the configuration information storage unit 5C is to store the respective configuration information. In this embodiment, the configuration information can include NAS configuration information D1; disk configuration information D2; snapshot configuration information D3; and remote copy configuration information D4.

The NAS configuration information D1 corresponds to the "first configuration information". The NAS configuration information D1 is for setting network addresses and user information in the NAS 1, 2. NAS configuration information D1 stored in the configuration information storage unit 5C comprises primary unique information D1A; secondary unique information D1B; and common information D1C.

Primary unique information D1A shows information unique to the primary NAS 1. Secondary unique information D1B shows information unique to the secondary NAS 2. The unique information can include, for example, the NAS device name; NAS serial number; cluster name; and the IP (Internet Protocol) address of the NAS communication port.

The common information D1C shows information to be commonly set in the respective NAS 1, 2. The common information D1C can include, for example, the IP addresses of the various types of management servers used by the NAS 1, 2; user information; file system name; and logical volume number.

The various types of management servers, for example, can include a NTP (Network Time Protocol) server used for time synchronization; DNS (Domain Name System) server for managing the corresponding relationship between a device name and an IP address; NIS (Network Information Service) server for sharing computer information over a communication network; SNMP (Simple Network Management Protocol) server for monitoring respective devices on a communication network; LDAP (Lightweight Directory Access Protocol) server for utilizing a directory service over a communication network; and a virus scan server for detecting and eliminating a computer virus.

The disk configuration information D2 corresponds to the "second configuration information". The disk configuration information D2 is information related to the configuration of the logical storage devices, and, for example, comprises a logical volume number; volume size; and RAID level.

The snapshot configuration information D3 is for managing the snapshot process, and, for example, comprises a snapshot target name; name of the storage-destination device for difference data; and snapshot creation time. The remote copy configuration information D4 is for managing the remote copy process, and, for example, comprises a remote copy target name, and information for specifying both a remote copy source volume and a remote copy target volume. The snapshot configuration information D3 and the remote copy configuration information D4 correspond to the "third configuration information".

The configuration information editor 5D corresponds to the "configuration information creation unit". The function of the configuration information editor 5D, for example, is to use the histories of the respective configuration information stored in the configuration information storage unit 5C to respectively create new respective configuration information to be set. Furthermore, when either one of the NAS 1, 2 is a new unit that has not been used, this unused NAS has no history, and the configuration information editor 5D uses a model prepared in advance to create the respective configuration information. The created respective configuration information is stored in the configuration information storage unit 5C.

The configuration information setting unit 5E is for setting newly created respective configuration information in the respective NAS 1, 2, or only in NAS 2. The configuration information setting unit 5E sends and sets the new configuration information to the setting-targeted NAS by way of the configuration information transceiver 5A.

The operation of this embodiment will be explained. First, this embodiment can be applied to a plurality of situations. The first situation is when the primary NAS 1 is already used, and a new secondary NAS 2 is added to the file sharing system. The second situation is one in which both the primary NAS 1 and the secondary NAS 2 are new units. The third situation is when both the primary NAS 1 and the secondary NAS 2 are already used, and the unused portions of the secondary NAS 2 are used to set the corresponding relationship between the primary NAS 1 and the secondary NAS 2.

The first situation will be explained. The first situation is one in which a new remote copy configuration is added to the already operating primary NAS 1. First, the setting device 5 initially sets the NAS configuration information D1 in the secondary NAS 2. More specifically, the setting device 5 sends the secondary unique information D1B and the common information D1C to the secondary NAS 2, and respectively sets this information D1B, D1C in the secondary NAS 2.

Next, the setting device 5 sends the disk configuration information D2 to the secondary NAS 2, and creates a logical volume (a logical storage device) as specified by the disk configuration information D2 in the secondary NAS 2. The disk configuration information D2 shows the configuration of the logical volume utilized by the primary NAS 1. Therefore, reflecting the disk configuration information D2 in the secondary NAS 2 can make the disk configurations of the respective NAS 1, 2 identical.

Next, the setting device 5 sends the snapshot configuration information D3 and the remote copy configuration information D4 to the secondary NAS 2, and respectively creates a snapshot configuration and a remote copy configuration in the secondary NAS 2. The logical volume created using the disk configuration information D2 is used to create the snapshot configuration and the remote copy configuration.

In the second situation, the primary NAS 1 and the secondary NAS 2 are both new units and thus both unused. As a result, the setting device 5 respectively sends to and sets in the NAS 1, 2 the NAS configuration information D1, the disk configuration information D2, the snapshot configuration information D3, and the remote copy configuration information D4. Furthermore, in this situation, the configuration of the secondary NAS 2 can be set based on the configuration of the primary NAS 1, which takes the lead in a remote copy.

The third situation is one in which the primary NAS 1 and the secondary NAS 2 are being operated separately, and a remote copy configuration is added afterwards. Therefore, the secondary NAS 2 cannot always provide the configuration desired by the primary NAS 1. This, for example, is because a plurality of all the disk drives possessed by the secondary NAS 2 is already used, and cannot be used in a new remote copy.

Accordingly, the setting device 5 uses the unused portions of the secondary NAS 2 to revise either all or a part of the respective configuration information in accordance with the current state of the secondary NAS 2 to set the new remote copy configuration. The setting device 5 respectively sends the revised respective configuration information to the primary NAS 1 and secondary NAS 2, and sets this information therein.

Configuring this embodiment like this makes it possible to set configurations in the respective NAS 1, 2 at practically the same time in accordance with an indication from the setting device 5, and to simplify and enhance the efficiency of the setting operation. Configuring this embodiment like this also makes it possible to greatly reduce the likelihood of mistakes occurring as compared to when the user sets the respective NAS 1, 2 manually, thereby improving operation quality.

In this embodiment, the NAS 1, 2 can determine the propriety of the setting contents indicated by the setting device 5. Therefore, setting operation mistakes can be prevented in advance, making it possible to automatically carry out a highly reliable setting operation. This embodiment will be explained in detail below.

[First Aspect]

Figure 2:
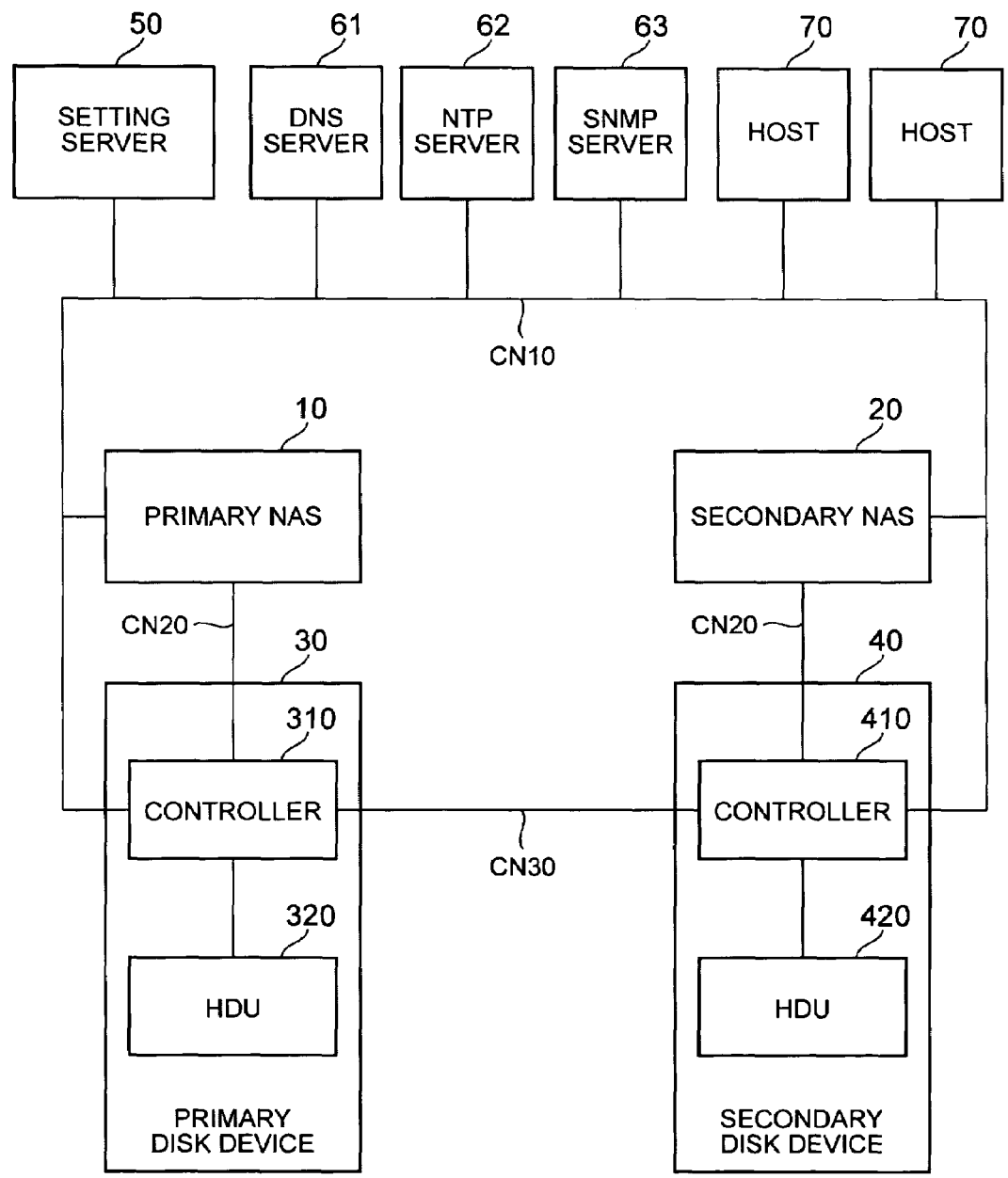
FIG. 2 is a block diagram showing the overall file sharing system related to the embodiment.

FIG. 2 is a schematic diagram simplistically showing the overall configuration of an information processing system comprising a file sharing system. This information processing system, for example, comprises a primary NAS 10; secondary NAS 20; primary disk device 30; secondary disk device 40; setting server 50; management servers 61 through 63; and one or a plurality of hosts 70.

The corresponding relationships with FIG. 1 will be explained first. The primary NAS 10 corresponds to primary NAS 1 of FIG. 1, secondary NAS 20 corresponds to secondary NAS 2 of FIG. 1, primary disk device 30 corresponds to primary disk 3 of FIG. 1, secondary disk device 40 corresponds to secondary disk 4 of FIG. 1, and setting server 50 corresponds to setting device 5 of FIG. 1, respectively.

The primary NAS 10 and primary disk device 30 are arranged in relatively close proximity to one another, and the secondary NAS 20 and secondary disk device 40 are also arranged in relatively close proximity to one another. The primary NAS 10 and the secondary NAS 20 can be arranged in close proximity to one another, or can be widely separated.

Next, the configuration of the communication network will be explained. The respective NAS 10, 20, respective disk devices 30, 40, setting server 50, respective management servers 61 through 63, and respective hosts 70 are all interconnected via a communication network CN10. The communication network CN10, for example, is configured as a communication network that is capable of using the TCP/IP (Transmission Control Protocol/Internet Protocol) of the Internet.

The primary NAS 10 and the primary disk device 30, and the secondary NAS 20 and the secondary disk device 40 are respectively connected by way of a communication network CN20. Communication network CN20, for example, is configured as a communication channel capable of using protocols like the iSCSI (internet Small Computer System Interface) and FCP (Fibre Channel Protocol). Furthermore, the respective NAS 10, 20 and the respective disk devices 30, 40 can also be directly connected using a fibre cable or metal cable without a network connection.

The primary disk device 30 and the secondary disk device 40, for example, are connected via a communication network CN30 capable of using a protocol like the iSCSI or FCP. The respective disk devices 30, 40 can also be connected directly via a fibre cable or metal cable.

The respective NAS 10, 20, respective disk devices 30, 40, and setting server 50 will be explained in detail by referring to the figures. Briefly stated, the respective NAS 10, 20 are computer devices for providing a file sharing service, and the respective disk devices 30, 40 are for storing files. The respective disk devices 30, 40 comprise controllers 310, 410; and disk drive mounting units 320, 420. Furthermore, in the following explanation, the disk drive mounting unit may be called the HDU.

The respective management servers 61 through 63 are used for monitoring times and statuses as described in FIG. 1. The host 70, for example, is configured as a server computer, and reads and writes files by accessing the primary NAS 10. Furthermore, the respective NAS 10, 20 can be configured to be accessed by respectively different hosts 70.

Figure 3:
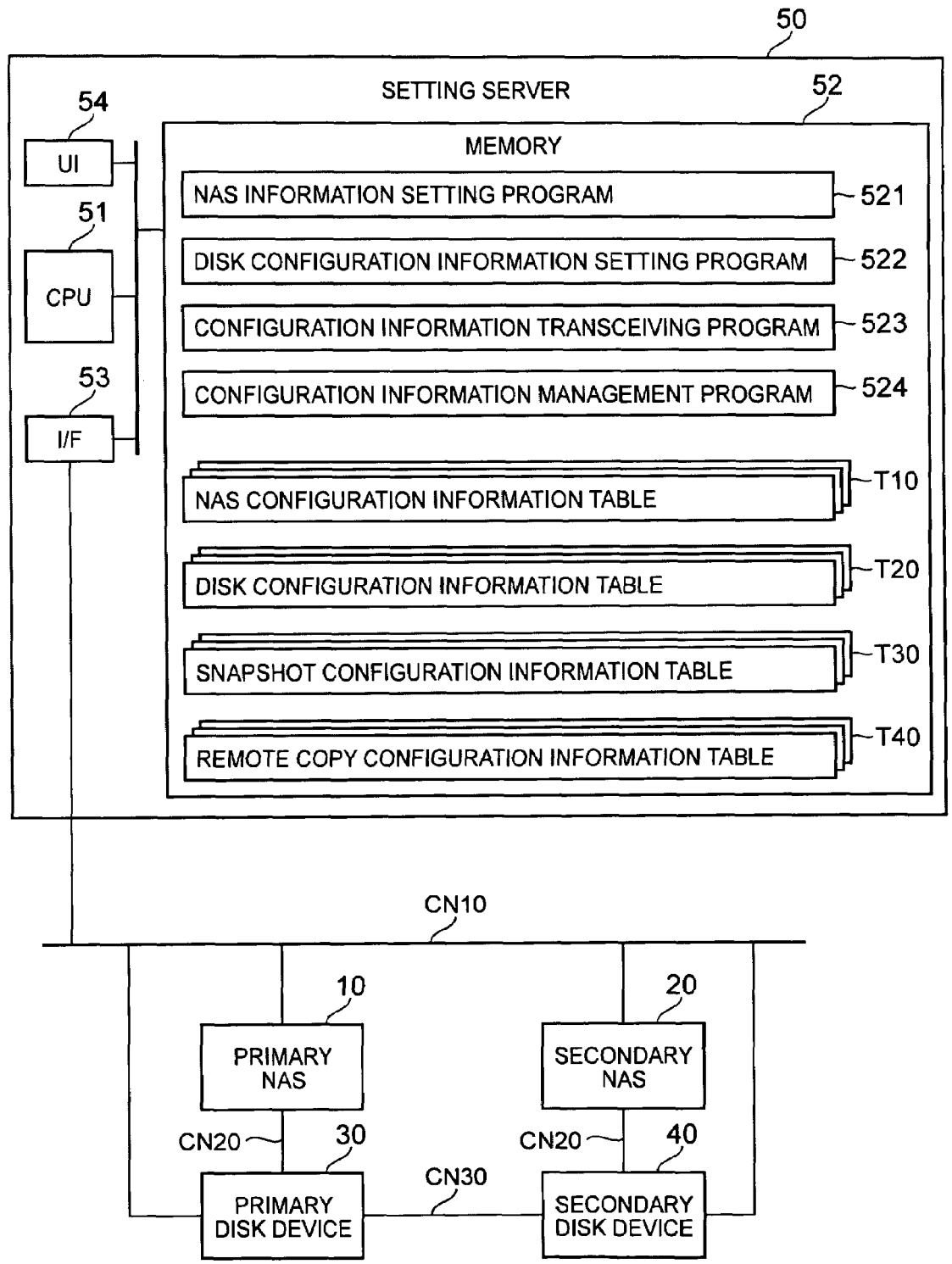
FIG. 3 is a block diagram of a setting server.

FIG. 3 is a block diagram showing the configuration of the setting server 50. The setting server 50, for example, comprises a central processing unit 51 (CPU 51 in the figure); memory 52; communication interface 53 (I/F 53 in the figure); and user interface 54 (UI 54 in the figure).

The memory 52, for example, is configured from RAM, ROM, a flash memory device, hard disk drive, and the like. For the sake of convenience, FIG. 3 shows a variety of programs 521 through 524 and a variety of tables T10 through T40 stored in a single memory 52. In actuality, for example, the respective programs 521 through 524 are stored in a memory device, such as a ROM (Read Only Memory) or a flash memory device. The respective tables T10 through T40 are stored in a device, such as a flash memory device or hard disk device.

A NAS information setting program 521 executes processing for respectively setting the NAS configuration information, which is stored in a NAS configuration information table T10, the snapshot configuration information, which is stored in a snapshot configuration information table T30, and the remote copy configuration information, which is stored in a remote copy configuration information table T40, either in both NAS 10, 20 or in the secondary NAS 20.

A disk configuration information setting program 522 executes processing for setting the disk configuration information, which is stored in a disk configuration information table T20, either in both the NAS 10, 20, or in the secondary NAS 20. A configuration information transceiving program 523 executes processing for sending respective configuration information to the NAS 10, 20, and processing for reading the set respective configuration information from the NAS 10, 20.

A configuration information management program 524 executes processing for managing the respective tables T10 through T40 stored in the memory 52. The configuration information management program 524 can also manage the histories of the respective tables T10 through T40.

The central processing unit 51 respectively realizes the above-described functions by reading in and executing the respective programs 521 through 524 as needed.

The communication interface 53 is a circuit for carrying out communications with the respective NAS 10, 20 via the communication network CN10. The user interface 54 is for the user to edit the respective configuration information and to indicate the setting of the respective configuration information. The user interface 54 comprises an information output device; and an information input device. The information output device, for example, can include a display device, a voice output device, or the like. The information input device, for example, can include a keyboard switch, a pointing device, or a voice input device. One example of a user interface screen will be explained hereinbelow.

Figure 4:
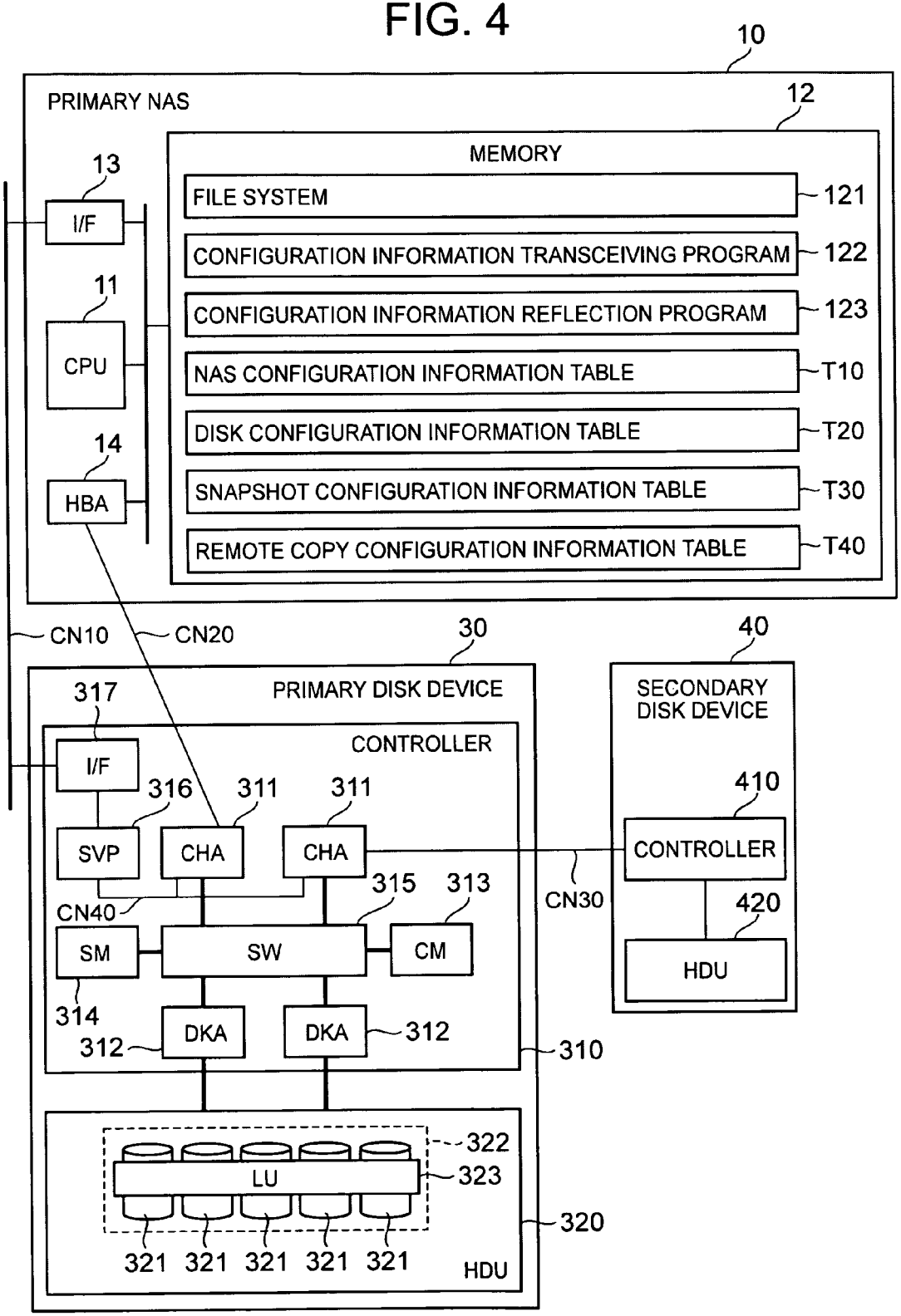
FIG. 4 is a block diagram of a primary NAS and a primary disk device.

FIG. 4 is a block diagram showing the configurations of the primary NAS 10 and the primary disk device 30. The configuration of the primary NAS 10 will be explained first. The primary NAS 10, for example, comprises a central processing unit 11; memory 12; communication interface 13; and host bus adapter 14.

The central processing unit 11 is for realizing the functions of the respective programs 121 through 123 by reading in and executing as needed the respective program 121 through 123 stored in the memory 12.

The memory 12 is configured from devices like RAM, ROM, a flash memory device, and a hard disk device. The memory 12, for example, respectively stores a file system 121, configuration information transceiving program 122, and a configuration information reflection program 123, as well as a NAS configuration information table T10, disk configuration information table T20, snapshot configuration information table T30, and remote copy configuration information table T40.

The file system 121 recognizes data stored in the primary disk device 30 as a file, and executes processing for carrying out a file read or write in accordance with an access request from the host 70. The file system 121 resides in a prescribed logical volume 323. However, for ease of understanding, the file system in shown inside memory in FIGS. 4 and 5.

The configuration information transceiving program 122 executes processing for delivering and receiving the respective configuration information to and from the setting server 50. The configuration information reflection program 123 executes processing for realizing inside the NAS 10 and the disk device 30 the setting contents (new respective configuration information) indicated by the setting server 50. The configuration information reflection program 123 is for setting configuration information received from the setting server 50 in the NAS side.

Since the respective tables T10 through T40 were described using FIG. 3, explanations of these tables will be omitted here. However, while the histories of the respective tables T10 through T40 are also managed in the setting server 50, only the most recent statuses of the respective tables T10 through T40 are managed in the NAS 10.

The communication interface 13 is a circuit for communicating with the setting server 50 and the host 70 via the communication network CN20. The host bus adapter (HBA in the figure) 14 is a circuit for communicating with the primary disk device 30 via the communication network CN20.

The configuration of the primary disk device 30 will be explained. The primary disk device 30, for example, comprises a controller 310; and a HDU 320. The controller 310 is for controlling the operation of the primary disk device 30. The HDU 320 is a device for mounting a plurality of disk drives 321.

The controller 310, for example, comprises a plurality of channel adapters 311 (hereinafter, CHA 311); a plurality of disk adapters 312 (hereinafter, DKA 312); cache memory 313 (CM 313 in the figure); shared memory 314 (SM 314 in the figure); connection controller 315 (SW 315 in the figure); service processor 316 (hereinafter, SVP 316); and communication interface 317 (communication I/F 317 in the figure).

The CHA 311 is a control board for carrying out communications with a higher-level device. In this aspect, the primary NAS 10 constitutes the higher-level device. The CHA 311 on the left side of FIG. 4 is connected to the HBA 14 of the primary NAS 10 via the communication network CN20, and carries out the transceiving of commands and data with the primary NAS 10.

By contrast, the CHA 311 shown in the right side of FIG. 4 is connected to the secondary disk device 40 by way of the communication network CN30, and carries out the transceiving of commands and data with the secondary disk device 40. That is, the CHA 311 connected to the primary NAS 10 comprises an initiator port, and the CHA 311 connected to the secondary disk device 40 comprises a target port.

The DKA 312 is a control circuit for carrying out communications with the respective disk drives 321. The DKA 312 accesses the disk drive 321, and executes reading and writing of requested data in accordance with a write command or a read command received from the CHA 311.

The cache memory 313 is for storing data received from the primary NAS 10, and data read out from the disk drive 321. The shared memory 314 is for storing various types of control information required for controlling the primary disk device 30. The disk configuration information of the primary disk device 30 is stored in the shared memory 314.

The connection controller 315, for example, is configured as a crossbar switch. The connection controller 315 respectively connects the CHA 311 and DKA 312 to the cache memory 313 and the shared memory 314.

The SVP 316 is connected to the respective CHA 311 via an internal communication network CN40. The SVP 316 collects via the CHA 311 information related to the various statuses of the primary disk device 30. Furthermore, SVP 316 is connected to the communication network CN10 by way of the communication interface 317. The primary NAS 10 can carry out the transceiving of disk configuration information with the primary disk device 30 via either communication network CN10 or communication network CN20.

The HDU 320 comprises a plurality of disk drives 321. The physical storage areas of the respective disk drives 321 can be virtualized as a RAID group 322. Either one or a plurality of logical volumes 323 of either a fixed size or a variable size can be disposed in the physical storage area of this RAID group 322. Furthermore, the storage area of one disk drive 321 can be used to provide either one or a plurality of logical volumes 323.

In this aspect, the storage media will be called a disk drive for ease of explanation, but the shape of the storage media is not limited to a disk. A disk drive is not limited to a hard disk device, but rather, a variety of devices capable of reading and writing data, such as, for example, a semiconductor memory device, optical disk device, magneto-optical disk device, magnetic tape device, flexible disk device can be used as disk drives.

Furthermore, when a hard disk device is utilized as the disk drive 321, for example, an FC (Fibre Channel) disk, SCSI (Small Computer System Interface) disk, SATA (Serial AT Attachment) disk, ATA (AT Attachment) disk, SAS (Serial Attached SCSI) disk and so forth can be used.

Furthermore, when a semiconductor memory device is utilized as the disk drive 321, for example, a variety of memory devices can be used, such as flash memory, FeRAM (Ferroelectric Random Access Memory), MRAM (Magnetoresistive Random Access Memory), Ovonic Unified Memory, and RRAM (Resistance RAM).

Figure 5:
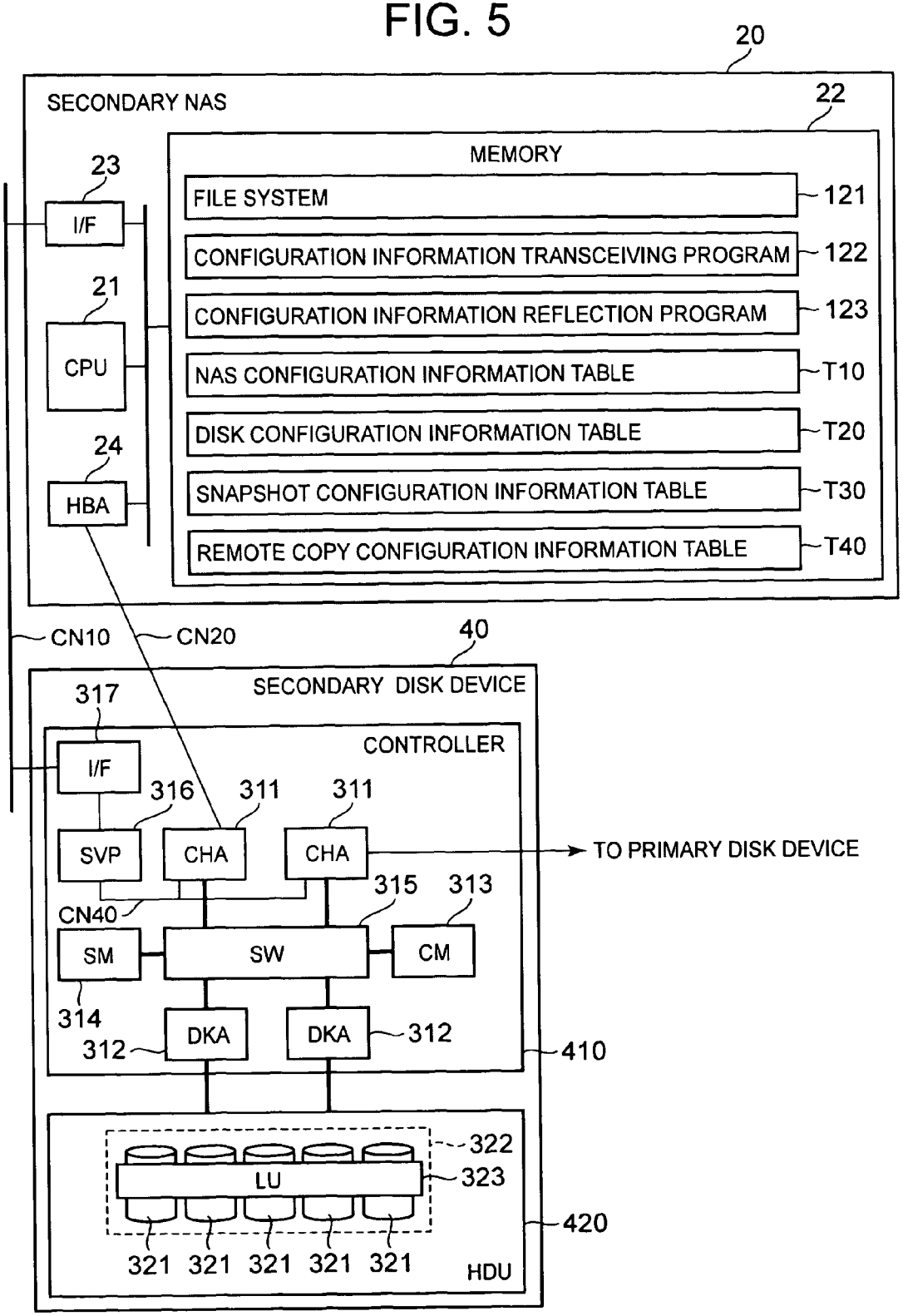
FIG. 5 is a block diagram of a secondary NAS and a secondary disk device.

FIG. 5 is a block diagram showing the configurations of the secondary NAS 20 and secondary disk device 40. The secondary NAS 20 and secondary disk device 40 can be configured the same as the primary NAS 10 and primary disk device 30 described using FIG. 4.

The secondary NAS 20, for example, comprises a central processing unit 21; memory 22; communication interface 23; and HBA 24. The memory 22 stores the respective programs 121 through 123, and the respective tables T10 through T40.

The secondary disk device 40 comprises a controller 410; and a HDU 420. The controller 410 comprises CHA 311, DKA 312 and so forth. The HDU 420 comprises a plurality of disk drives 321. Since the secondary NAS 20 and the secondary disk device 40 comprise the same configurations as the configurations described using FIG. 4, a duplicative explanation will be omitted.

Figure 6:
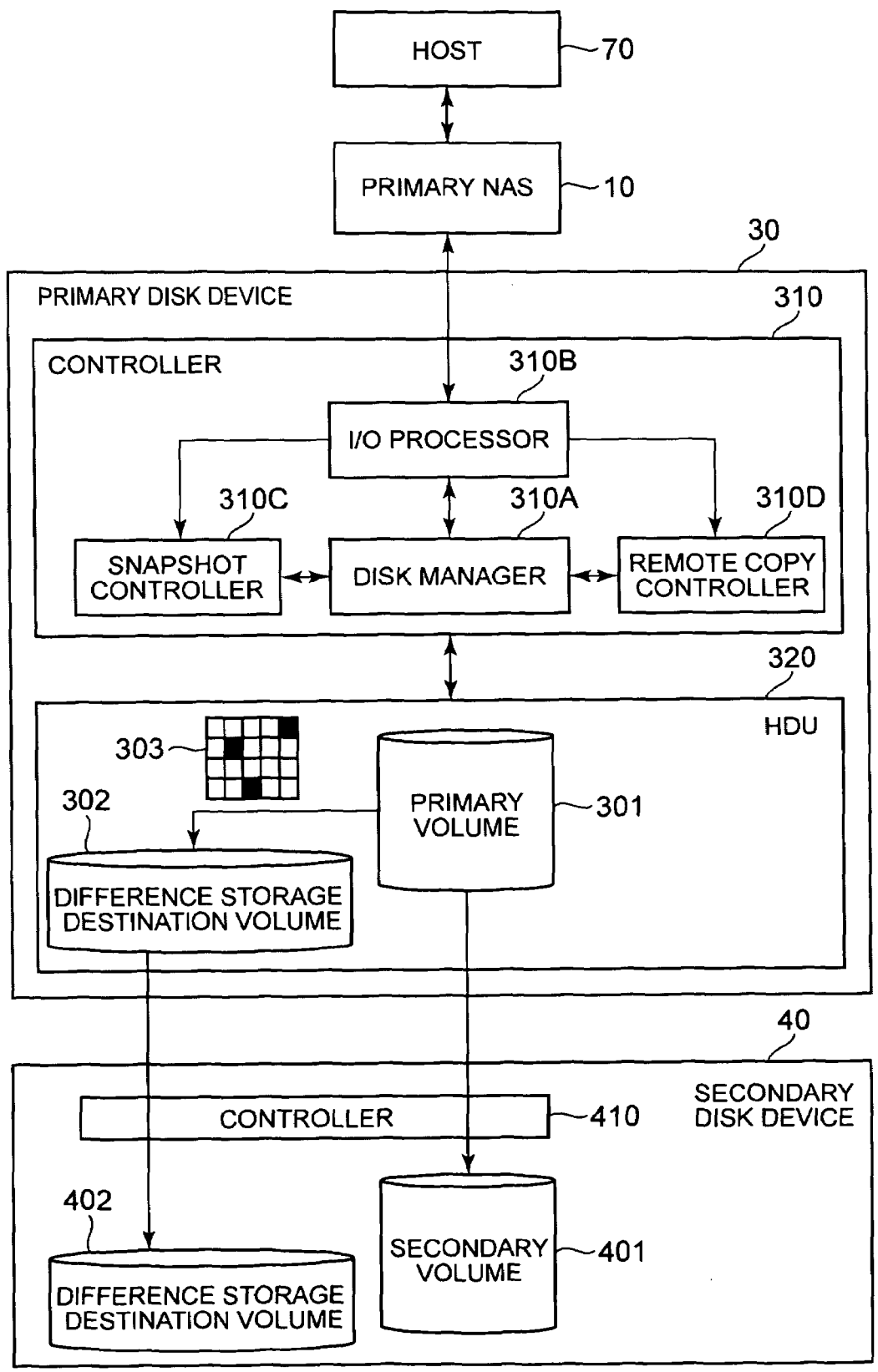
FIG. 6 is a diagram schematically showing the functions of a disk device.

FIG. 6 is a schematic diagram simplistically showing the functions of the primary disk device 30. A controller 310, for example, comprises a disk manager 310A; input/output processor 310B (I/O (Input/Output) processor 310B in the figure); snapshot controller 310C; and remote copy controller 310D.

The disk manager 310A is for managing the respective disk drives 321 and logical volume 323 of the primary disk device 30. The input/output processor 310B is for reading/writing data from/to the logical volume 323 in accordance with a read command and write command received from the primary NAS 10. Snapshot controller 310C is for controlling a snapshot process. The remote copy controller 310D is for controlling a remote copy process.

Either one or a plurality of logical volumes 323 can be used as a primary volume 301. The data of a file used by the host 70 is stored in the primary volume 301. The host 70 uses the file data stored in the primary volume 301 by way of the primary NAS 10.

When the storage content of the primary volume 301 is updated by a file update request issued from the host 70, the pre-update old data is read out from the primary volume 301 and stored in a difference storage destination volume 302. That is, the old data is saved to the difference storage destination volume 302. This kind of processing method will be called a copy-on-write. The difference storage destination volume 302 corresponds to a difference storage destination device C33, which will be explained hereinbelow.

The update location of the primary volume 301 and the storage destination address of the old data saved to the difference storage destination volume 302 are managed in accordance with difference management information 303. The difference management information 303, for example, manages the differences that occur in the primary volume 301 in prescribed units, like block units. A difference in the primary volume 301 is based on the storage content of the primary volume 301 at a certain point in time, and is difference data that occurs subsequent to that point in time.

Therefore, it is possible to virtually restore a desired generation of storage content using the current storage content of the primary volume 301 and snapshots of the respective generations. Furthermore, the storage content of a desired generation can also be materialized by writing the virtually restored storage content to a separate logical volume 323.

The remote copy controller 310D transfers data, which has been written to a remote copy source volume, to a remote copy target volume, and stores this data therein. A secondary volume 401 is disposed in the secondary disk device 40. The secondary volume 401 forms a remote copy pair with the primary volume 301. The primary volume 301 is the remote copy source volume, and the secondary volume 401 is the remote copy target volume.

Similarly, a difference storage destination volume 402 is disposed in the secondary disk device 40. The respective difference storage destination volumes 302, 402 form a remote copy pair. The primary-side difference storage destination volume 302 is the remote copy source volume, and the secondary-side difference storage destination volume 402 is the remote copy target volume.

The storage contents of the primary volume 301 and difference storage destination volume 302 are respectively remote copied to the secondary volume 401 and the difference storage destination volume 402 inside the secondary disk device 40. Therefore, even if a failure should occur in the primary disk device 30, the file sharing service can be provided to the host 70 using the secondary disk device 40.

Figure 7:
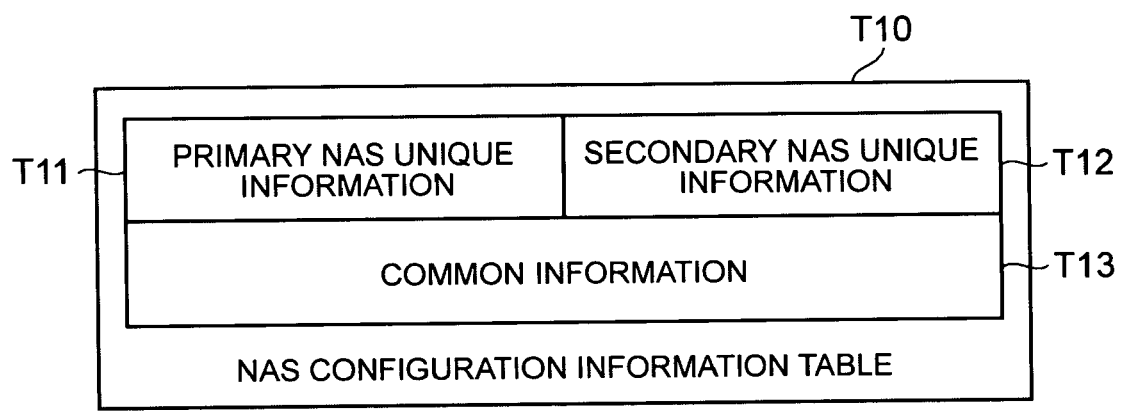
FIG. 7 is a schematic diagram showing an overview of a NAS configuration information table.

The respective configuration information will be explained in detail on the basis of FIGS. 7 through 12. FIG. 7 is a schematic diagram showing an overview of the NAS configuration information table T10. The NAS configuration information table T10 comprises information T11 unique to the primary NAS 10; information T12 unique to the secondary NAS 20; and information T13 common to the respective NAS 10, 20.

FIG. 8 shows examples of the information T11, T12 unique to the respective NAS 10, 20. The information T11 unique to the primary NAS 10, for example, respectively manages the device name C111; serial number C112; node name C113; cluster name C114; and port IP address C115. Furthermore, the port IP address C115 manages this IP address for each communication port of the respective controllers disposed in the primary NAS 10. The explanation was omitted in FIG. 4, but the primary NAS 10 comprises a plurality of controllers comprising a central processing unit 11 and a memory 12. The respective controllers each comprise a plurality of communication ports.

The device name C111 is the name of the primary NAS 10. The serial number C112 is an identification number, which was set for the primary NAS 10 when it was shipped from the factory. The node name C113 is information for identifying the respective controllers of the primary NAS 10. The cluster name C114 is information for identifying a cluster configured from the respective controllers.

The bottom portion of FIG. 8 shows the information T12 unique to the secondary NAS 20. This unique information T12 also manages the device name C121; serial number C122; node name C123; cluster name C124; and port IP address C125, the same as the information T11 unique to the primary NAS 10 described hereinabove.

The information of the respective items described above is information unique to the primary NAS 10 and the secondary NAS 20.

FIG. 9 is a schematic diagram showing an example of the information T13 that is common to the respective NAS 10, 20. The common information T13, for example, manages the IP address C131 of the management server; user information C132; and file system information C133.

The management server IP address C131, for example, manages an IP address C1311 for accessing a NTP server; an IP address C1312 for accessing a DNS server; and an IP address C1313 for accessing a SNMP server.

The user information C132, for example, manages a name C1321 of a group, which uses the file sharing service; and a name C1322 of users belonging to this group.

The file system information C133, for example, manages names C1331, C1333 of the respective file systems; and logical volume numbers (LUN: (Logical Unit Number)) C1332, C1334 for identifying the logical volumes in which these file systems are stored.

FIG. 10 is a schematic diagram showing an example of the disk configuration information table T20. In the explanations of the respective tables hereinbelow, the primary disk device 30 will be used and explained as the main example, but the same tables are used for the secondary disk device 40 as well.

The disk configuration information table T20, for example, respectively manages a device name C21; serial number C22; RAID configuration information C23, and logical volume (LU) configuration information C24.

Device name C21 is information for identifying disk device 30 (or disk device 40). The serial number C22 is an identification number set at the time the disk device 30 (or the disk device 40) was shipped from the factory.

The RAID configuration information C23 is information for managing the configuration of the RAID group 322 provided in the disk device. The RAID configuration information C23, for example, respectively manages a RAID group number C231; RAID level C232; drive type C233; drive size C234; configuration C235; disk start location C236; and total size C237.

The RAID group number C231 is for identifying the respective RAID groups 322. The RAID level C232, for example, shows the type of RAID, like RAID 5, RAID 6, RAID 1+0, and so forth. The drive type C233, for example, shows the type of disk drive 321, such as an FC disk, or SATA disk. The drive size C234 shows the capacity of the disk drive 321.

The configuration C235 shows the number and roles of the disk drives 321 configuring the RAID group 322. For example, 4D+1P signifies that the RAID group 322 is configured from four data disks (disk drives that store data) and one parity disk (a disk drive that stores parity).

The disk start location C236 is information for specifying the locations of the disk drives 321 configuring the relevant RAID group 322. For example, when the RAID group 322 is configured from a total of five disk drives 321, specifying the location of the first disk drive 321 thereof automatically determines the locations of the remainder of the disk drives 321. The total size C237 shows the total capacity of the RAID group 322. In the case of RAID 5 or RAID 6, the total capacity is a value arrived at by multiplying the drive size by the number of data disks.

The LU configuration information C24 manages the configuration of the logical volume 323. The LU configuration information C24, for example, respectively manages a LUN C241; controller number C242; volume size C243; and status C244.

The controller number C242 is information for identifying the controller in charge of accessing the relevant logical volume 323. The volume size C243 shows the capacity of the relevant logical volume 323.

The status C244 is information showing the status of the relevant logical volume 323. The status C244 can include a variety of states. For example, there is a status for showing that the logical volume can be used normally; a status for showing that a failure has occurred; an access control-related status; and a remote copy-related status. The access control-related status, for example, can include a status for allowing only a person having administrator privileges to carry out a read and write; and a status for showing whether or not a copy is in progress. To save paper, in FIG. 10, the status is shown as item C244 without particularly distinguishing between the respective statuses.

FIG. 11 is a schematic diagram showing an example of the snapshot configuration information table T30. The snapshot configuration information table T30 is used for managing snapshot processing. The snapshot configuration information table T30, for example, respectively manages a file system name C31; number of generations C32; difference storage destination device C33; maximum number of automatic creations C34; automatic mount identifier C35; maximum number of mounts C36; acquisition schedule C37; and other information C38.

The file system name C31 shows the snapshot acquisition target. The number of generations C32 shows the number of snapshot generations. The difference storage destination device C33 shows the logical volume in which the pre-update old data is stored (for example, volumes 302 and 402 of FIG. 6). The maximum number of automatic creations C34 shows the maximum number of snapshots to be automatically acquired. The automatic mount identifier C35 shows the identifier used when mounting a snapshot volume. The maximum number of mounts C36 shows the maximum number of snapshot volumes capable of being mounted. The acquisition schedule C37 shows the schedule for when snapshots are automatically acquired. The other information C38 can include the unit for saving difference data to the difference data storage destination device, and the utilization ratio of the difference storage destination device.

FIG. 12 is a schematic diagram showing an example of the remote copy configuration information table T40. The remote copy configuration information table T40 is used for managing remote copy processing. The remote copy configuration information table T40, for example, respectively manages a remote copy pair name C41; primary NAS setting C42; and secondary NAS setting C43.

The remote copy pair name C41 is information for specifying the target of a remote copy, and, for example, comprises a remote copy target type C411; and target area C412. The remote copy target type C411 is information for distinguishing whether the remote copy target is a file system or a snapshot volume. The target area C412 is information for specifying the target of a remote copy.

The primary NAS setting C42 shows setting information related to a remote copy source, and, for example, comprises a device name C421; and a LUN C422. Consequently, the primary NAS setting C42 specifies which logical volume 323 of which disk is the remote copy source volume. Similarly, the secondary NAS setting C43 shows the setting information related to the remote copy destination, and comprises a device name C431; and LUN C432.

Figure 13:
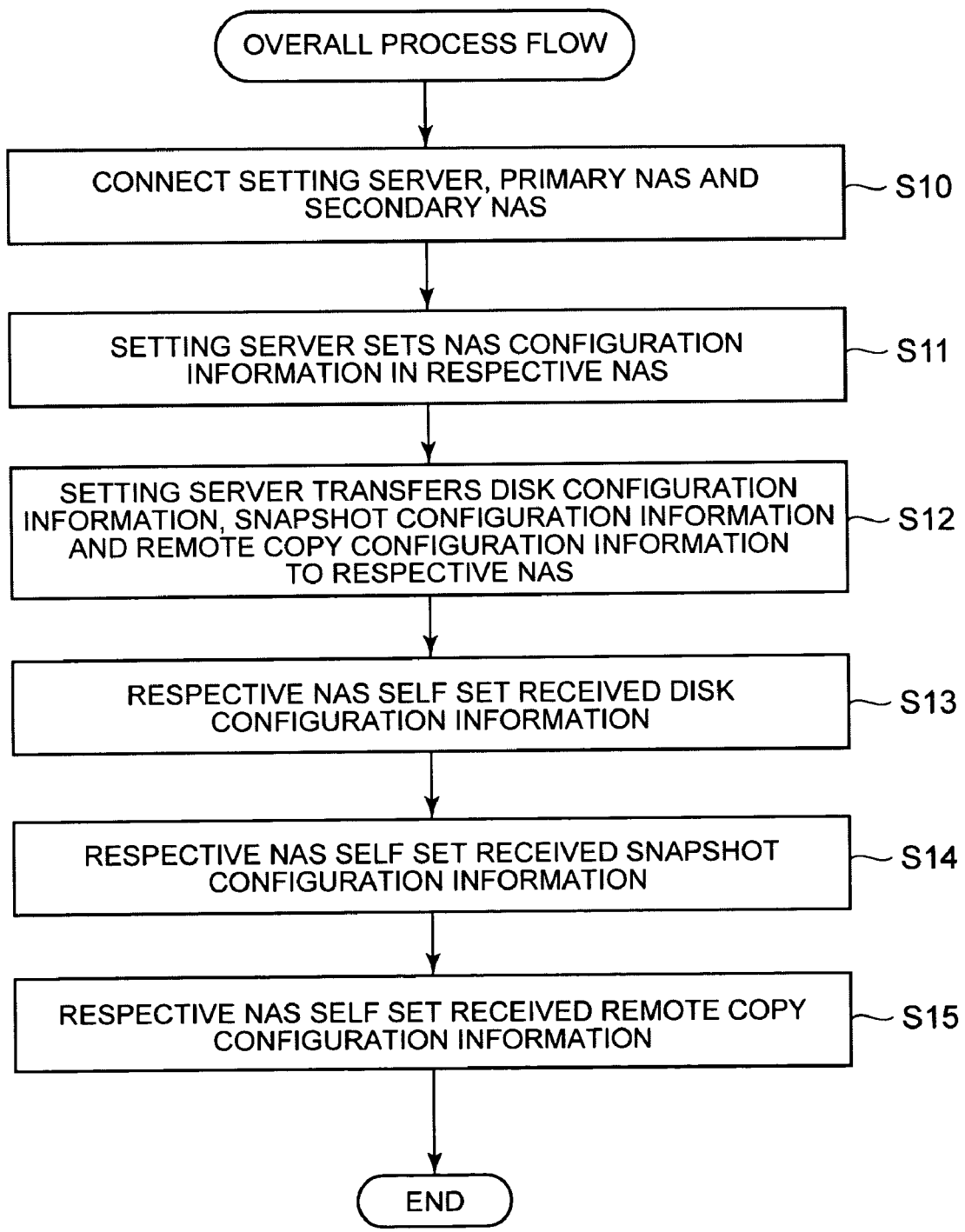
FIG. 13 is a flowchart showing the overall flow of operations.

A method for setting the file sharing system will be explained on the basis of FIGS. 13 through 20. FIG. 13 is a flowchart schematically showing the overall flow of the setting method. The respective flowcharts shown hereinbelow present overviews of respective processes to the extent necessary to understand and implement the present invention, and may differ from actual computer programs. Further, a so-called person having ordinary skill in the art should be able to change or delete steps shown in the figures, and to add a new step.

First, the user initially connects the setting server 50 and the respective NAS 10, 20 by way of the communication network CN10 (S10). Next, the setting server 50 sets NAS configuration information in the respective NAS 10, 20 (S11). Step S11 will be explained in detail using FIG. 14.

The setting server 50 respectively acquires disk configuration information created by the user, snapshot configuration information, and remote copy configuration information, and transfers this configuration information to the respective NAS

10, 20 (S12). The setting server 50 initially transfers the disk configuration information, then transfers the snapshot configuration information and remote copy configuration information.

The respective NAS 10, 20 themselves set the disk configuration information received from the setting server 50 (S13). Step S13 will be explained in detail using FIG. 17. Next, the respective NAS 10, 20 themselves set the snapshot configuration information received from the setting server 50 (S14). Step S14 will be explained in detail using FIG. 19. Additionally, the respective NAS 10, 20 themselves set the remote copy configuration information received from the setting server 50 (S15). Step S15 will be explained in detail using FIG. 20.

Figure 14:
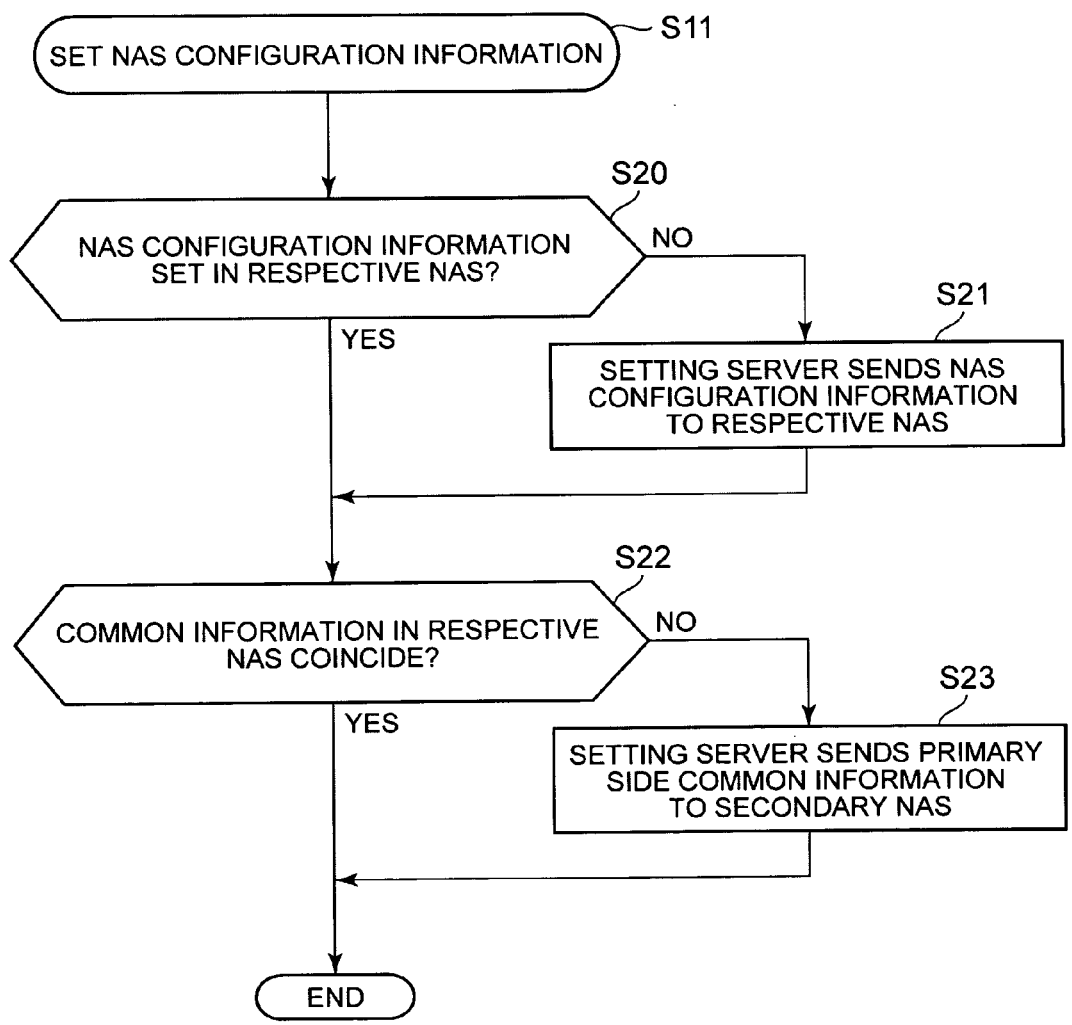
FIG. 14 is a flowchart showing the process for setting NAS configuration information in a NAS.

FIG. 14 is a flowchart showing the details of S11 of FIG. 13. Initially, the setting server 50 determines whether or not the NAS configuration information has already been set in the respective NAS 10, 20 (S20).

Furthermore, the setting server 50 can automatically determine whether or not the NAS configuration information is set in the respective NAS 10, 20, for example, based on whether or not the NAS configuration information of the respective NAS 10, 20 is stored in the setting server 50 memory 52. Or, the user can also manually show whether or not the NAS configuration information has been set in the NAS 10, 20.

When the primary NAS 10 and secondary NAS 20 are already in operation, the respective NAS configuration information is already set in the NAS 10, 20. That is, the information unique to the primary NAS and the common information have been set in the primary NAS 10, and the information unique to the secondary NAS and the common information have been set in the secondary NAS 20 (S20: YES).

By contrast, when either one or both of the primary NAS 10 and secondary NAS 20 have been newly installed, the NAS configuration information is not set in the newly installed NAS (S20: NO).

When the NAS configuration information has yet to be set in either one or both of the NAS 10, 20 (S20: NO), the setting server 50 sends the NAS configuration information to the NAS in which the NAS configuration information has not been set (S21).

The setting server 50 determines whether or not the pieces of common information of the NAS configuration information set in the respective NAS 10, 20 coincide with each other (S22). That is, the setting server 50 compares the common information comprised in the NAS configuration information set in the primary NAS 10 against the common information comprised in the NAS configuration information set in the secondary NAS 20, and determines whether or not the common information of the primary side coincides with the common information of the secondary side (S22).

When the two pieces of common information coincide (S22: YES), this processing ends. When the two pieces of common information do not coincide (S22: NO), the setting server 50 sends the common information of the primary side to the secondary NAS 20, and replaces the common information of the secondary NAS 20 with the common information of the primary side (S23). Consequently, the common information of the primary side will coincide with the common information of the secondary side.

Figure 15:
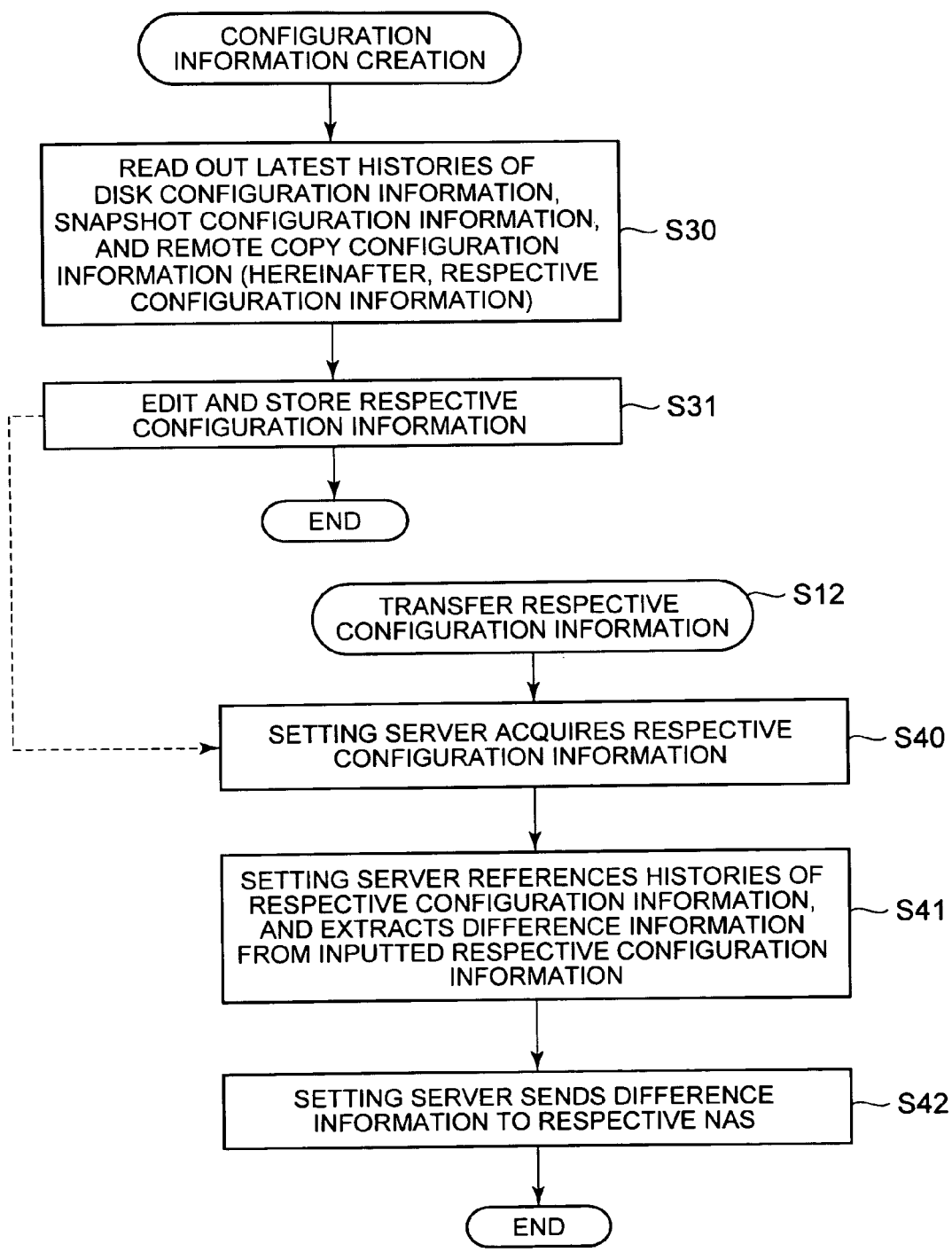
FIG. 15 is a flowchart showing the process for creating configuration information and the process for sending configuration information to a NAS.

FIG. 15 is a flowchart showing the process in which the user creates the respective configuration information, and the details of step S12 of FIG. 13. The user, for example, can use the user interface 54 of the setting server 50 to edit the respective configuration information.

The user can read out the latest histories of the respective configuration information (the disk configuration information, snapshot configuration information, and remote copy configuration information) stored in the memory 52 of the setting server 50 to a screen of the setting server 50, and input a new setting value (S30). Or, the user, for example, can also utilize a model prepared beforehand in the form of a spreadsheet to create the respective configuration information.

Figure 16:
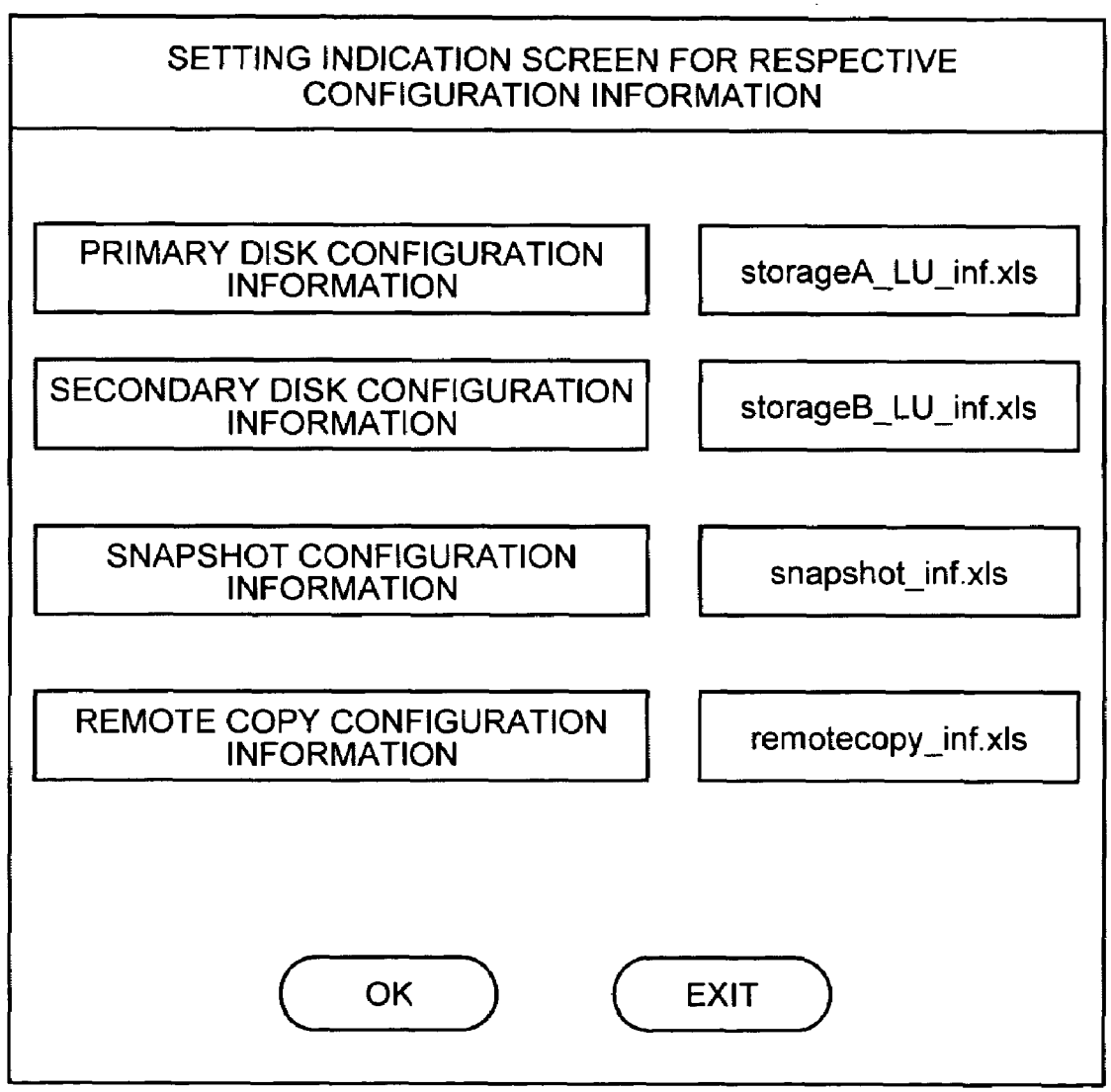
FIG. 16 is a schematic diagram showing the screen for the user to select configuration information and to indicate the execution of a setting.

Upon finishing the task of editing (creating) the respective configuration information, the user stores the respective configuration information in the setting server 50, and indicates setting start to the setting server 50 (S31). Refer to FIG. 16. FIG. 16 is the screen for indicating the setting of the respective configuration information. In accordance with this indication screen, the user specifies the files of the respective configuration information to be set, and operates the execution button (OK button).

Return to FIG. 15. The setting server 50 receives the indication from the user, and reads out from memory 52 the respective configuration information created by the user (S40). The setting server 50 compares the new respective configuration information created by the user against the respective configuration information histories, and extracts the difference information of the two (S41).

That is, the setting server 50, prior to sending the respective configuration information, respectively extracts the difference between the new disk configuration information created by the user and the disk configuration information currently used, the difference between the new snapshot configuration information created by the user and the snapshot configuration information currently used, and the difference between the new remote copy configuration information created by the user and the remote copy configuration information currently used (S41).

The setting server 50 respectively sends the differences of the respective configuration information to the NAS 10, 20 (S42). Sending the differences of the respective configuration information to the NAS 10, 20 makes it possible to reduce the amount of data being sent, and to shorten the time required to complete the settings for the respective NAS 10, 20. In particular, it is possible to send only the information related to a remote copy to be newly added thereto when setting a new remote copy in the already operating NAS 10, 20, thereby making it possible to reduce the time required to complete the setting operation.

Figure 17:
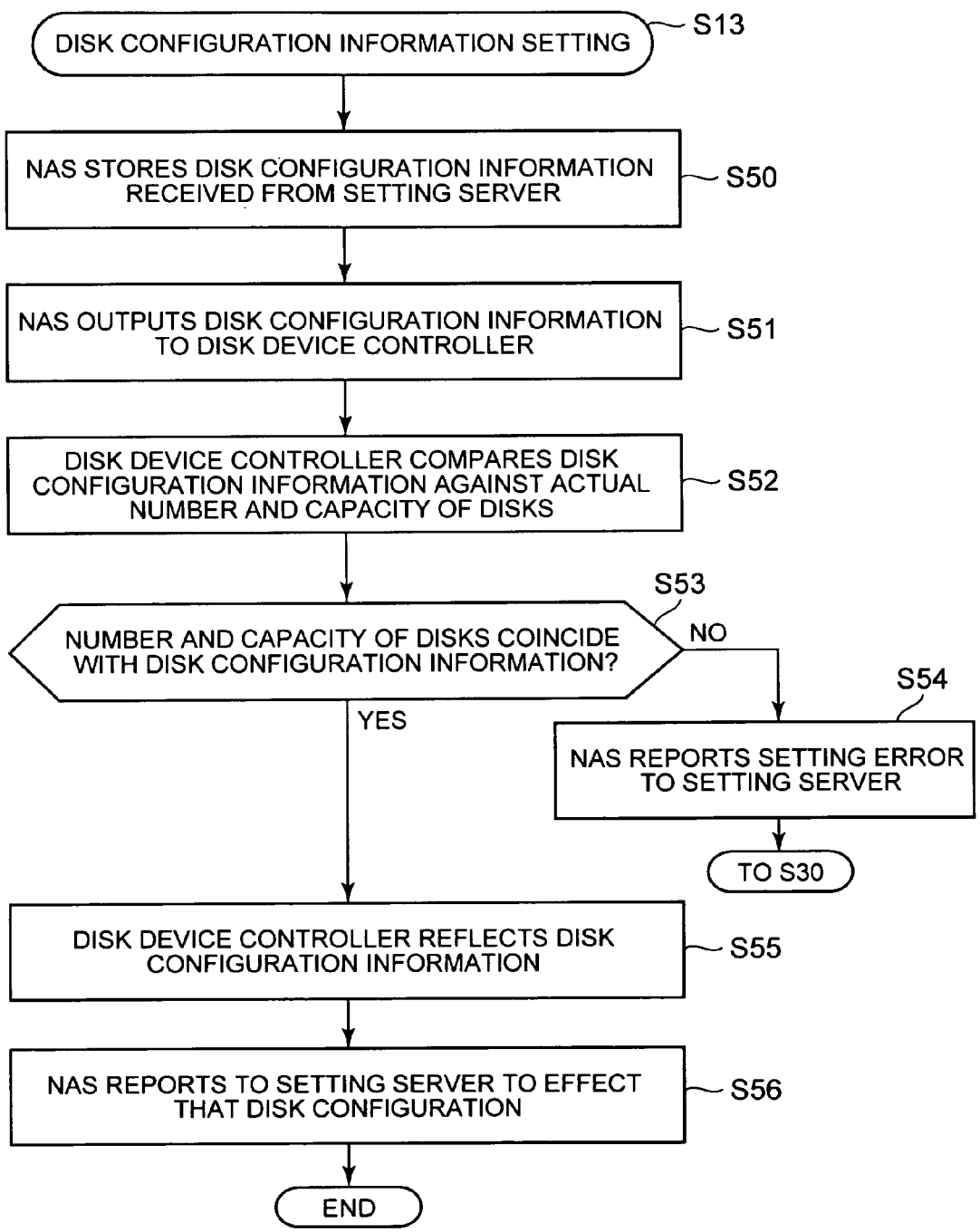
FIG. 17 is a flowchart showing the process for setting disk configuration information in a NAS.

FIG. 17 is a flowchart showing the details of step S13 of FIG. 13. For the sake of convenience, secondary side processing will be explained, but this processing can also be executed on the primary side.

The secondary NAS 20 stores the disk configuration information received from the setting server 50 in the memory 22 (S50). The secondary NAS 20 outputs the disk configuration information to the controller 410 of the secondary disk device 40 (S51).

The controller 410 of the secondary disk device 40 compares the disk configuration information received form the secondary NAS 20 against the actual configuration of the HDU 420 (S52). The controller 410, for example, determines whether or not the number of disk drives 321 comprising the HDU 420, and the storage capacity thereof, coincide with the disk configuration information received from the secondary NAS 20 (S53).

That is, the controller 410 determines whether or not the physical configuration indicated from the secondary NAS 20 conforms to the actual physical configuration, and determines whether or not the physical configuration indicated from the secondary NAS 20 can be realized. When the disk configuration information received from the secondary NAS 20 does not coincide with the actual disk configuration (S53: NO), the controller 410 notifies the secondary NAS 20 to the effect that the disk configuration information do not coincide. Consequently, the secondary NAS 20 notifies the setting server 50 to the extent that the disk configuration information received from the setting server 50 cannot be set (S54).

Figure 18:
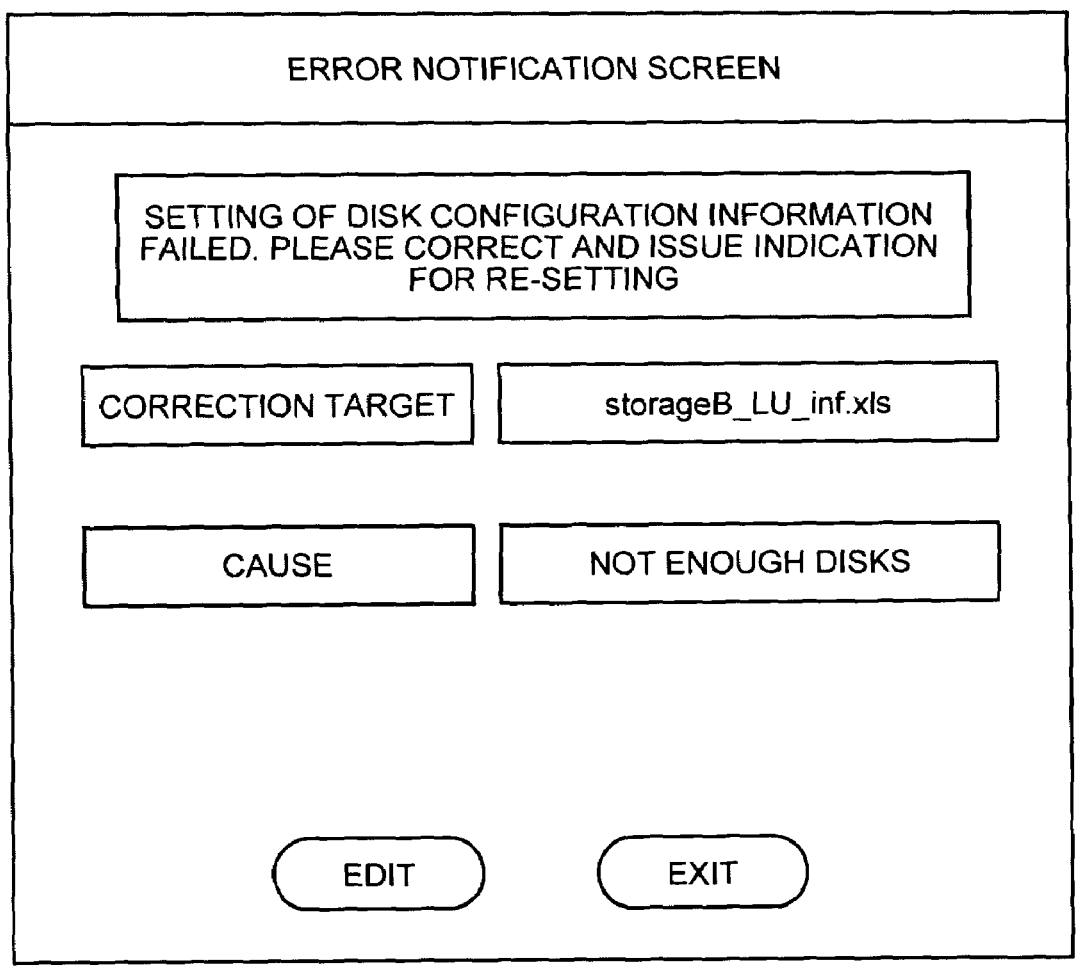
FIG. 18 is a schematic diagram showing the screen, which notifies the user to the effect that a setting failed.

As shown in FIG. 18, upon receiving an error notification from the secondary NAS 20, the setting server 50 displays a setting error on the screen of the setting server 50. This error notification screen can display information to the effect that setting of the disk configuration information failed, the filename of the failed disk configuration information, and the cause of the setting error. The user can re-edit the disk configuration information for which setting failed, and can once again indicate setting execution.

Return to FIG. 17. When the disk configuration information received from the secondary NAS 20 coincides with the actual disk configuration (S53: YES), the controller 410 reflects the disk configuration information received from the secondary NAS 20 (S55).

The reflection of the disk configuration information signifies the creation of a disk configuration as depicted in this disk configuration information. For example, when the disk configuration information indicates that a prescribed logical volume 323 is to be set in a RAID group 322 of a prescribed configuration, the controller 410 creates the prescribed configuration RAID group 322, and sets the prescribed logical volume 323 in this prescribed configuration RAID group 322.

The controller 410 of the secondary disk device 40 reports to the secondary NAS 20 to the effect that the disk configuration was set as indicated. Consequently, the secondary NAS 20 reports to the setting server 50 to the effect that the disk configuration information setting process (the disk configuration information reflection process) has ended (S56).

Figure 19:
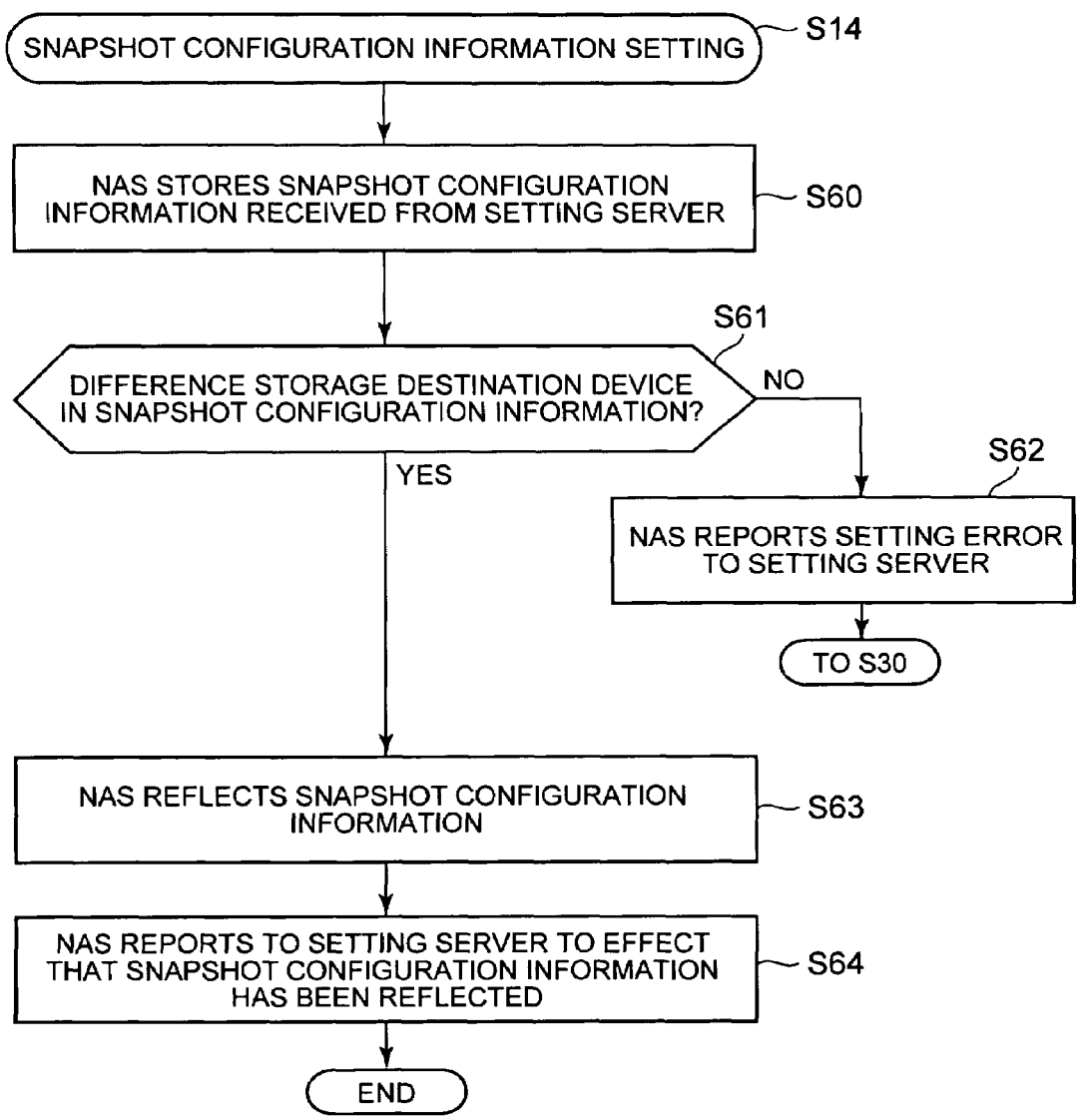
FIG. 19 is a flowchart showing the process for setting snapshot configuration information in a NAS.

FIG. 19 is a flowchart showing the details of step S14 of FIG. 13. The secondary NAS 20 stores the snapshot configuration information received from the setting server 50 in the memory 22 (S60), and determines whether or not the difference storage destination device shown in the snapshot configuration information exists (S61).

The secondary NAS 20 acquires information related to the actual disk configuration from the controller 410 of the secondary disk device 40, and stores this information in the memory 22 (disk configuration information table T20 of FIG. 5). Therefore, the secondary NAS 20 can determine whether or not the difference storage destination device actually exists based on the actual disk configuration.

When the difference storage destination device (difference storage destination volume 402) shown in the snapshot configuration information received from the setting server 50 does not exist (S61: NO), the secondary NAS 20 reports to the setting serve 50 to the effect that the setting of the snapshot configuration information has failed (S62).

When the user has properly created the disk configuration information and snapshot configuration information, and the setting process for the disk configuration information described using FIG. 17 has ended normally, the difference storage destination device shown in the snapshot configuration information exists inside the secondary disk device 40 (S61: YES).

Accordingly, the secondary NAS 20 reflects the snapshot configuration information received from the setting server 50 (S63), and reports setting-complete to the setting server 50 (S64). The reflection of the snapshot configuration information signifies the realization of the snapshot configuration as depicted in the snapshot configuration information. For example, the secondary NAS 20 automatically acquires a snapshot for the snapshot targeted file system that was indicated in accordance with the indicated schedule, and saves the difference data in the indicated difference storage destination device.

Figure 20:
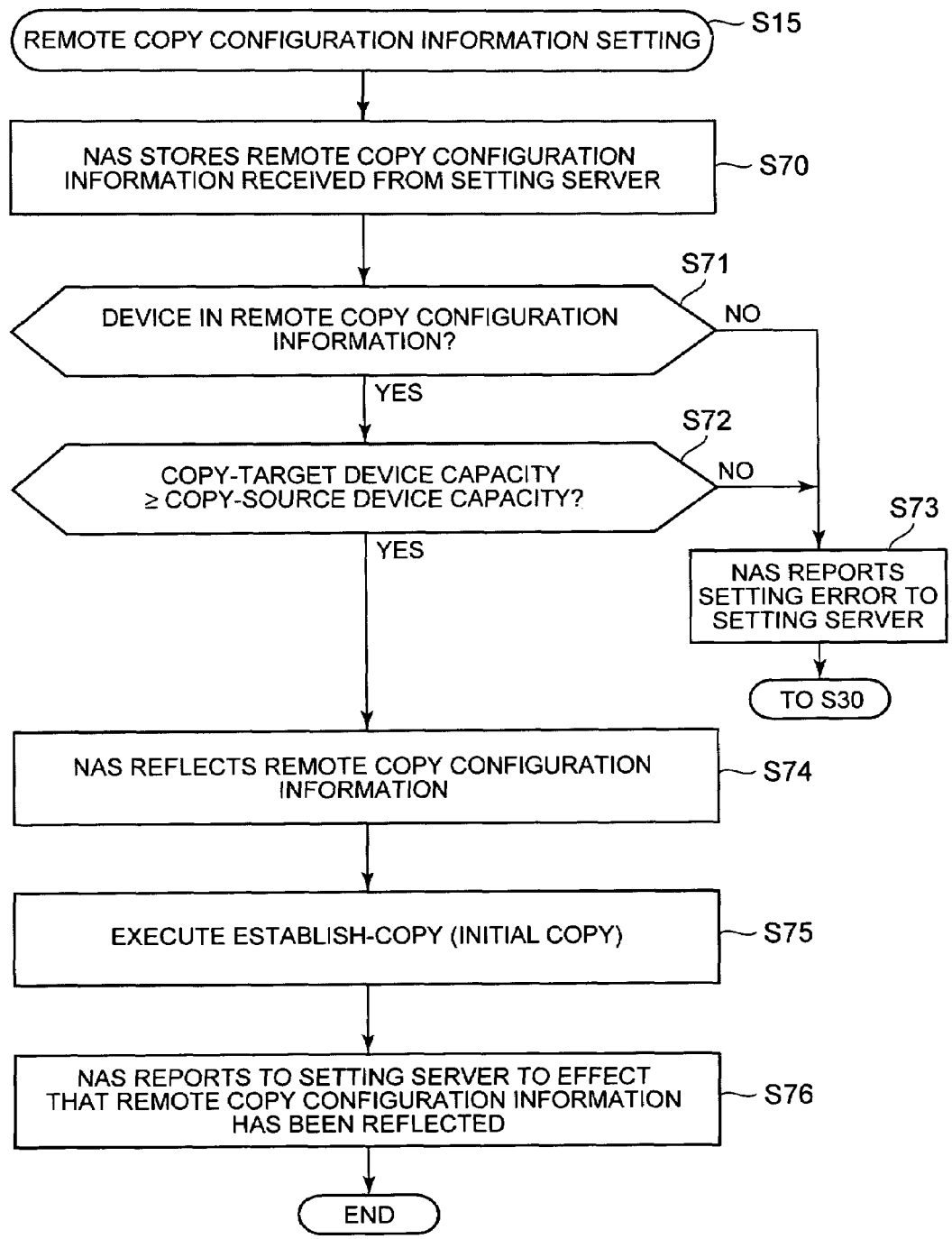
FIG. 20 is a flowchart showing the process for setting remote copy configuration information in a NAS.

FIG. 20 is a flowchart showing the details of step S15 of FIG. 13. The secondary NAS 20 stores the remote copy configuration information received from the setting server 50 in the memory 22 (S70), and determines whether or not the device (logical volume) shown in the remote copy configuration information exists inside the HDU 420 (S71).

When the logical volume (secondary volume 401) used in the remote copy exists (S71: YES), the secondary NAS 20 determines whether or not the capacity of the copy-target device (remote copy-target volume 401) is greater than the capacity of the copy-source device (remote copy-source volume 301) (S72).

When the logical volume used in a remote copy does not exist (S71: NO), or, the size of the remote copy-target volume is smaller than the size of the remote copy-source volume (S72: NO), the secondary NAS 20 reports to the setting server 50 to the effect that the setting of the remote copy configuration information has failed (S73).

When the logical volume used in a remote copy exists (S71: YES), and the size of the remote copy-target volume is larger than the size of the remote copy-source volume (S72: YES), the secondary NAS 20 reflects the remote copy configuration information received from the setting server 50 (S74). That is, the secondary NAS 20 realizes the remote copy configuration as indicated.

After completing a establish-copy (S75), the secondary NAS 20 reports to the setting server 50 to the effect that the remote copy configuration information received from the setting server 50 has been set (S76).

The establish-copy is a process for transferring and writing the storage content of the remote copy-source volume to the remote copy-target volume, and is also called an initial-copy. The start of the establish-copy, for example, can be carried out under the leadership of the primary NAS 10 based on a notification from the secondary NAS 20 to the primary NAS 10.

In accordance with the completion of the establish-copy, the storage contents of the remote copy-source volume and the remote copy-target volume will coincide. Thereafter, when the remote copy-source volume is updated, the update data is transferred and written to the remote copy-target volume.

Configuring this aspect like this makes it possible to collectively complete the setting operations of the respective NAS 10, 20 at practically the same time by sending the respective configuration information from the setting server 50 to the NAS 10, 20. Therefore, setting operation efficiency can be improved compared to when the user makes the settings manually, enhancing ease-of-use for the user.

In this aspect, the respective configuration information is centrally managed by the setting server 50, and the respective NAS 10, 20 determine beforehand whether or not the respective configuration information indicated from the setting server 50 are realizable. Therefore, human error can be prevented when setting this information manually, and, furthermore, when the configuration information created by the user comprises an error, this error can be detected and a user correction requested. Consequently, it is possible to heighten the reliability of the setting operation, thereby enhancing the ease-of-use of the user.

In this aspect, the setting server 50 first sends the NAS configuration information, then sends the disk configuration information, and finally sends the snapshot configuration information and remote copy configuration information to the respective NAS 10, 20. Therefore, the network configuration can be set first, the disk configuration can be set next, and the snapshot and remote copy configurations can be set last. Consequently, the setting of the respective NAS 10, 20 can be smoothly carried out.

[Second Aspect]

A second aspect will be explained on the basis of FIG. 21. In this aspect, the unused portions of the secondary NAS 20 are utilized to set a new remote copy configuration. Furthermore, this aspect and the aspects that follow correspond to variations of the first aspect. The explanation will therefore focus on the characteristic features of this aspect without duplicating those of the first aspect.

Figure 21:
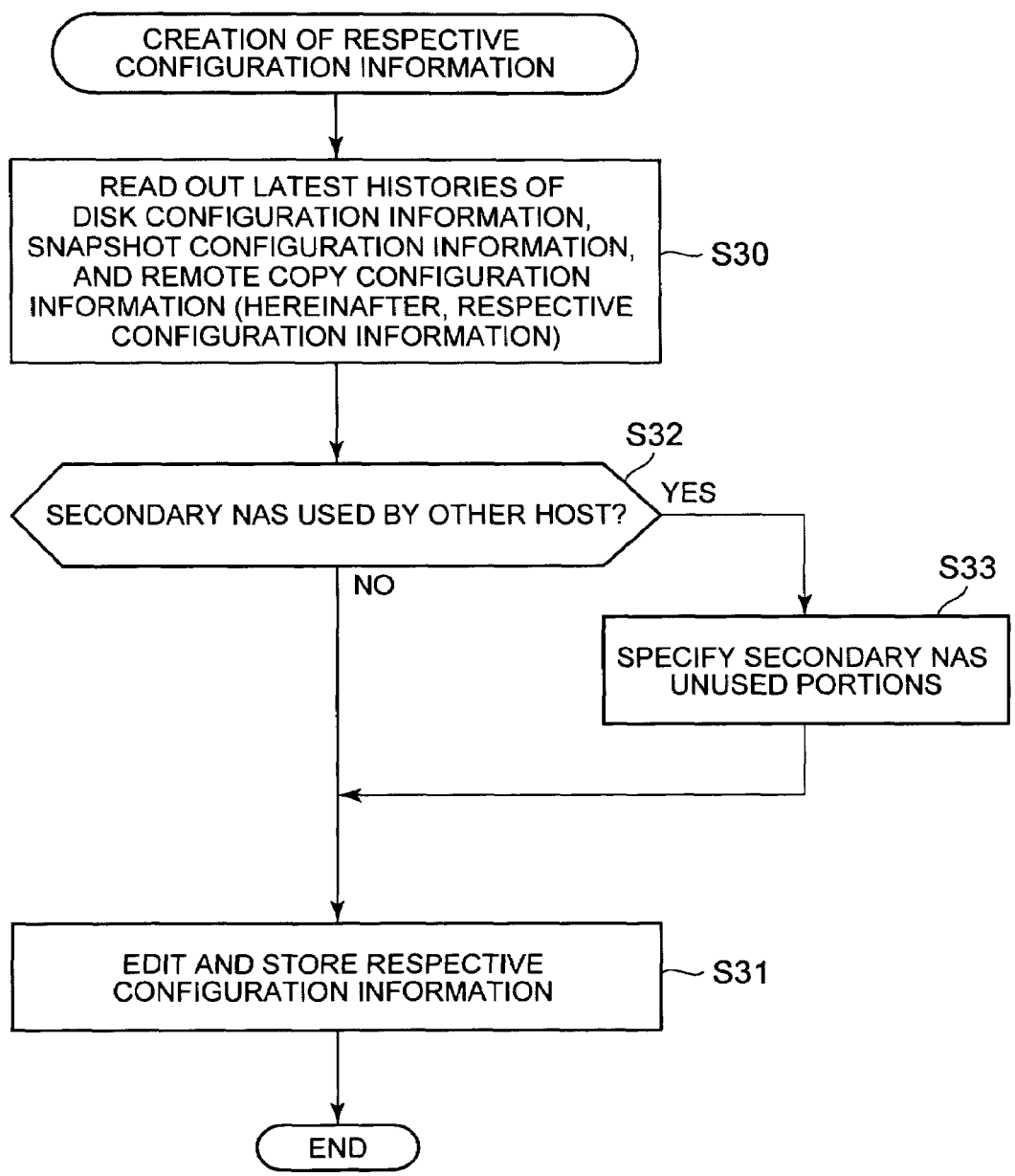
FIG. 21 is a flowchart showing a configuration information creation process related to a second aspect.

FIG. 21 is a flowchart showing the process by which the user creates the respective configuration information. It is supposed that the secondary NAS 20 is in operation, and that a different host 70 than the host 70, which used the primary NAS 10, is using the secondary NAS 20. In this case, the physical resources (disk drive 321 and logical volume 323) of the secondary NAS 20 cannot be used to the extent desired with the primary NAS 10.

Accordingly, the following processing is carried out. First, the latest histories of the respective configuration information are called up and displayed on the setting server 50 screen (S30). The setting server 50 determines whether or not the secondary NAS 20 is used by a different host 70 based on the latest histories (S32).

When a different host 70 is using the secondary NAS 20 (S32:YES), the setting server 50 specifies the unused portions of the physical storage resources of the secondary NAS 20 (S33), and notifies the user of these specified unused portions.

The user utilizes the unused portions of the secondary NAS 20 to create new respective configuration information, and stores this information in the setting server 50 (S31).

Furthermore, instead of the method described above, a method in which the setting server 50 rewrites either all or part of the respective configuration information created by the user such that the user-created respective configuration information makes use of the unused portions of the secondary NAS 20. The respective configuration information rewritten by the setting server 50 is presented to the user, and is not transferred to the respective NAS 10, 20 until after being approved by the user.

Configuring this aspect like this also achieves the same effects as the first aspect. In addition, in this aspect, even when the secondary NAS 20 is already used by a different host 70, it is still possible to add a new remote copy configuration using the unused portions of the secondary NAS 20.

[Third Aspect]

Figure 22:
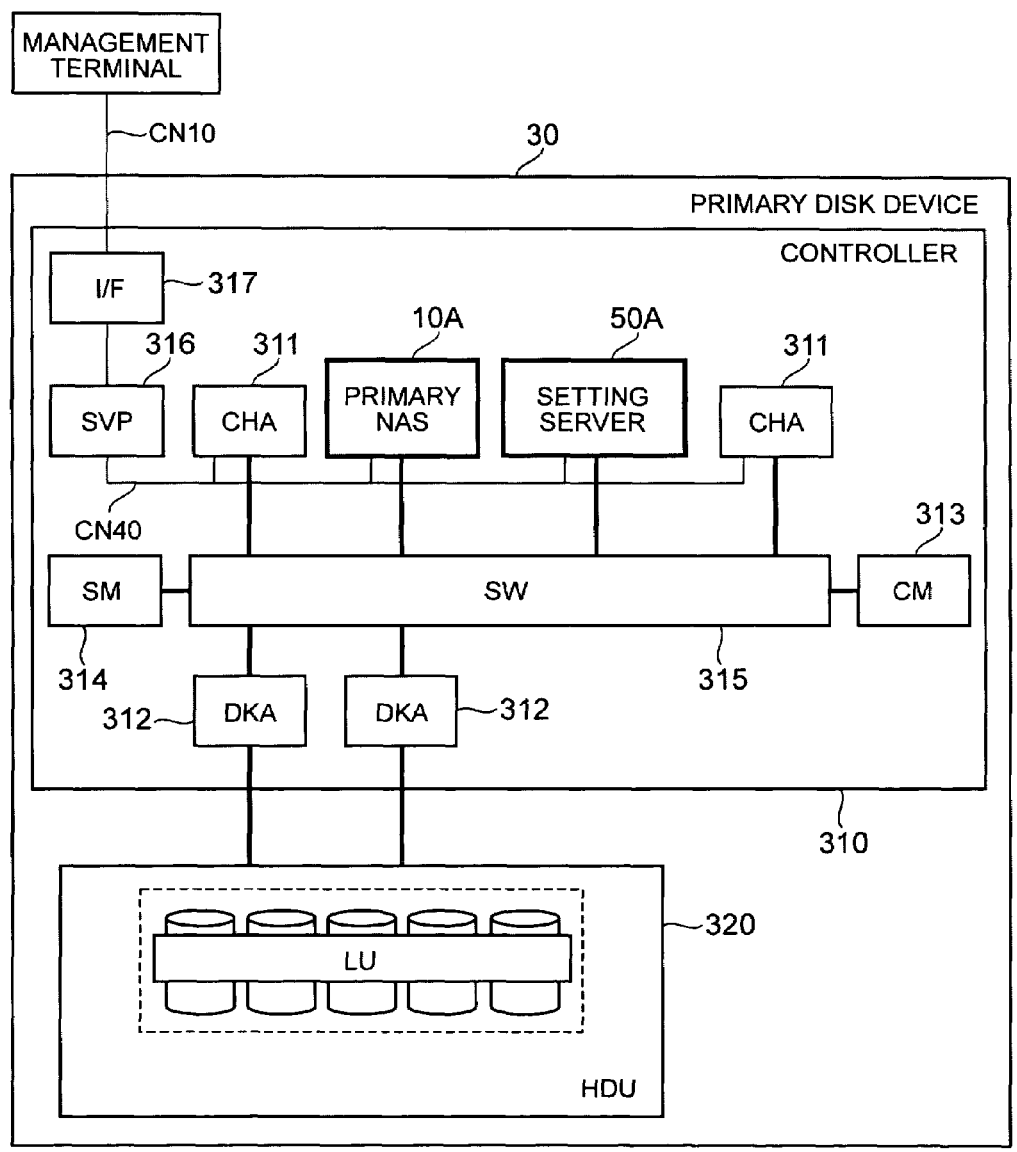
FIG. 22 is a block diagram showing the configuration of a disk device utilized in a file sharing system related to a third aspect.

FIG. 22 is a block diagram showing one part of a system related to a third aspect. In this aspect, the primary NAS 10A and setting server 50A are respectively built into the primary disk device 30. The secondary NAS 20 can be built into the secondary disk device 40.

Configuring this aspect like this also achieves the same effects as the first aspect. In addition, in this aspect, since the primary NAS 10A and setting server 50A are respectively built into the primary disk device 30, the system configuration can be simplified, thereby making the system even easier for the user to use.

Furthermore, the present invention is not limited to the respective aspects described hereinabove. A person having ordinary skill in the art will be able to make various additions and changes without departing from the scope of the present invention.

What is claimed is:

1. A file sharing system, comprising: a first file sharing device having a first storage device; a second file sharing device having a second storage device; and a setting device connected to the file sharing devices, wherein the setting device comprises:
a configuration information storage unit for respectively storing first configuration information required for providing the file sharing devices to a host computer via a communication network, second configuration information for respectively setting the configurations of the storage devices, and third configuration information required for executing a prescribed process carried out between the first storage device and the second storage device;
a configuration information manager for respectively managing the respective configuration information stored in the configuration information storage unit; and
a configuration information setting unit for respectively setting the respective configuration information in the file sharing devices by respectively sending the respective configuration information to either one or both of the file sharing devices in a prescribed order of the first configuration information, the second configuration information, and the third configuration information,
wherein the configuration information manager respectively manages the history of prescribed one or a plurality of pieces of information of the respective configuration information, and
comprises a configuration information creation unit for using the history of the respective prescribed configuration information to create new prescribed configuration information to be set, and
the configuration information setting unit respectively sends to either one or both of the file sharing devices the difference between the contents of the new prescribed configuration information created by the configuration information creation unit, and the histories.

2. The file sharing system according to claim 1, wherein the first configuration information comprises unique information peculiar to each of the file sharing devices, and common information, which is common to the file sharing devices, and
the configuration information setting unit: (1) determines whether or not the common information set in the first file sharing device coincides with the common information set in the second file sharing device by respectively accessing the file sharing devices; and (2) when the two pieces of common information do not coincide, makes the common information of the first file sharing device coincide with the common information of the second file sharing device by sending the common information set in the first file sharing device to the second file sharing device, and setting this common information in the second file sharing device.

3. The file sharing system according to claim 1, wherein, when the second file sharing device is already used by a different host computer, the configuration information creation unit uses unused portions of the second file sharing device not used by the different host computer to create the prescribed new respective configuration information.

4. The file sharing system according to claim 1, wherein the prescribed configuration information is the second configuration information and the third configuration information.

* * * * *